(12) United States Patent
Cheeseman et al.

(10) Patent No.: US 12,482,153 B2
(45) Date of Patent: Nov. 25, 2025

(54) SYSTEM FOR CLUSTERING DATA POINTS

(71) Applicant: Oxford Nanoimaging Limited, Oxford (GB)

(72) Inventors: Bevan Cheeseman, Oxford (GB); Marco Caselli, Oxford (GB); William Lohrmann, Oxford (GB)

(73) Assignee: Oxford Nanoimaging Limited, Oxford (GB)

( * ) Notice: Subject to any disclaimer, the term of this patent is extended or adjusted under 35 U.S.C. 154(b) by 190 days.

(21) Appl. No.: 18/275,346

(22) PCT Filed: Feb. 2, 2022

(86) PCT No.: PCT/EP2022/052480
§ 371 (c)(1),
(2) Date: Aug. 1, 2023

(87) PCT Pub. No.: WO2022/167483
PCT Pub. Date: Aug. 11, 2022

(65) Prior Publication Data
US 2024/0104804 A1 Mar. 28, 2024

(30) Foreign Application Priority Data
Feb. 2, 2021 (GB) .................................... 2101432

(51) Int. Cl.
*G06T 11/20* (2006.01)
(52) U.S. Cl.
CPC ........ *G06T 11/206* (2013.01); *G06T 2200/24* (2013.01); *G06T 2210/41* (2013.01)
(58) Field of Classification Search
CPC ............... G06T 11/206; G06T 2200/24; G06T 2210/41; G06V 10/7625; G06V 10/95; G06F 7/18
See application file for complete search history.

(56) References Cited

U.S. PATENT DOCUMENTS

| | | |
|---|---|---|
| 2017/0091527 A1 | 3/2017 | Sarachan et al. |
| 2020/0193056 A1 | 6/2020 | Hughes et al. |

OTHER PUBLICATIONS

Çagatay Demiralp, Clustrophile: A Tool for Visual Clustering Analysis, Oct. 5, 2017, arXiv preprint arXiv:1710.02173, 9 pages. (Year: 2017).*

(Continued)

*Primary Examiner* — Jeffery A Brier
(74) *Attorney, Agent, or Firm* — Wolf, Greenfield & Sacks, P.C.

(57) ABSTRACT

A computer system and method for clustering data points comprises a computer server configured to: store a dataset compris-ing a plurality of data points; determine a plurality of candidate clusters for the plurality of data points, where each candidate cluster corresponds to a respec-tive set of the plurality of data points; determine, for each candidate cluster, one or more properties of that candidate cluster; and transmit, to the client device, a sample of the plurality of data points, information indicative of the plurality of candidate clusters, and information indicative of the one or more properties de-termined for each candidate cluster; and a client device configured to: receive the sample of data points, information indicative of the plurality of candidate clusters, and information indicative of the one or more properties determined for each candidate cluster; and determine a cluster constraint, wherein the cluster constraint relates to at least one of the one or more properties of each candidate cluster; select one or more candidate clusters from the plurality of candidate clusters, wherein the at least one property of each selected candidate cluster satisfies the determined cluster constraint.

24 Claims, 7 Drawing Sheets

(56) References Cited

OTHER PUBLICATIONS

Kwon et al., Clustervision: Visual Supervision of Unsupervised Clustering, Aug. 29, 2017, IEEE transactions on visualization and computer graphics, p. 142-151. (Year: 2017).*

International Search Report and Written Opinion dated Jun. 3, 2022, in connection with PCT/EP2022/052480.

Cavallo Marco et al., Clustrophile 2: Guided Visual Clustering Analysis. IEEE Transactions on Visualization and Computer Graphics, IEEE, USA. Jan. 1, 2019; 25(1):267-276.

* cited by examiner

500

| Candidate cluster ID | distanceBirth | distanceDeath | $S_c$ | Property 1 | Property 2 | ... |
|---|---|---|---|---|---|---|
| 1 | * | * | * | * | * | |
| 2 | * | * | * | * | * | |
| 3 | * | * | * | * | * | |
| ... | | | | | | |

| X | Y | distanceBleed | parentID | ... |
|---|---|---|---|---|
| * | * | * | * | |
| * | * | * | * | |
| * | * | * | * | |
| ... | | | | |

Fig. 5b

SYSTEM FOR CLUSTERING DATA POINTS

RELATED APPLICATIONS

This application is a national stage application filed under 35 U.S.C. 371 based on International Patent Application No.: PCT/EP2022/052480, filed on Feb. 2, 2022, which claims priority to Great Britain patent Application No. 2101432.9, filed on Feb. 2, 2021, the disclosure of which are incorporated herein by reference in their entirety.

FIELD OF THE INVENTION

The present invention relates to a computer system and method for clustering data points, in order to facilitate data visualisation and analysis.

BACKGROUND

Clustering algorithms are often used for analysing data in scenarios where data points form dense regions, as a way to partition the data points into groups of data points known as clusters. As an example, in the field of single-molecule localisation microscopy (SMLM) individual data points in a recorded image may correspond to estimated fluorophore positions, such that clusters of data points may represent biological structures (e.g. proteins or other biomolecules). Once the biological structures have been characterised, this can give valuable information on nano-scale interactions, e.g. in a cell. However, finding the clusters is an inherently subjective task, because in most real datasets points can form clusters at different length scales, such that no one partitioning of points into clusters can accurately capture this information. As a consequence, there are no commonly used clustering algorithms that do not include parameters that make assumptions on either the number of clusters or some description on the nature of the clusters desired. Instead of having a universal set of parameters that work in all cases there have been two main proposed solutions in the literature.

A first solution is to run a clustering algorithm multiple times with different parameters, and choose a set of parameters where the results are particularly stable with respect to changing the parameters (this is commonly referred to as the elbow method). However, this process is still subjective and for many datasets there may not be a clear point at which this criterion is met. Furthermore, for larger datasets the computational cost of running the algorithm multiple times may be prohibitive.

A second solution is employed in the HDBSCAN clustering algorithm, which involves constructing a hierarchical set of candidate clusters, and then choosing a particular subset candidate clusters that is deemed most optimal. The HDBSCAN clustering algorithm is described, for example, in the publication "Density-Based Clustering Based on Hierarchical Density Estimates" by R. Campello, D Moulavi and J. Sander (Advances in Knowledge Discovery and Data Mining, pp 160-172, April 2013). A drawback of the HDBSCAN clustering algorithm is that it is computationally expensive to run and has high peak memory requirements (its memory requirements are super-linear in the number of data points to be clustered), which may limit its adoption.

The present invention has been devised in light of the above considerations.

SUMMARY OF THE INVENTION

At its most general, the present invention provides a system for clustering a set of data points, which facilitates real-time interactive clustering of the data points. According to the invention, a set of candidate clusters is pre-computed for the set of data points at a computer server, together with one or more properties for each of the candidate clusters. Then, the set of candidate clusters, their determined properties, and a sample of the data points are transmitted to a client device. The client device can then select one or more clusters from the set of candidate clusters, based on the determined properties of the candidate clusters, and a cluster constraint which is determined at the client device (e.g. based on a user input made at the client device). The client device may then generate an output based on the selected candidate clusters, e.g. it may display the sample of data points in accordance with the selected candidate clusters. In other words, the processing and memory intensive step of computing the candidate clusters and their properties is performed remotely at the computer server, whilst the less intensive step of selecting one or more of the candidate clusters is performed at the client device.

In this manner, once the client device receives the set of candidate clusters and their properties from the computer server, the sample of data points can be interactively clustered at the client device. This may significantly reduce a computational load at the client device, as all of the candidate clusters and their properties are pre-computed at the computer server. Moreover, as the candidate clusters and their properties are computed at the computer server, the client device need not store the entire set of data points, such that only a sample (e.g. a subset of) of the data points need be provided to the client device. This may reduce the memory requirements for the client device, as well as facilitate clustering of large sets of data points at the client device. In particular, the candidate clusters may be selected and visualised at the client device, without having to store the entire set of data points at the client device. Due to the reduced computational load at the client device, the selection of candidate clusters at the client device may not require specialised software, and can for example be performed using a web browser. This may enable data clustering to be performed using a wide range of (non-specialised) client devices, as well as facilitate sharing data and clustering results.

According to a first aspect of the invention, there is provided a client device configured to: receive, from a computer server, a sample of data points, information indicative of a plurality of candidate clusters, and information indicative of one or more properties of each candidate cluster, wherein each candidate cluster corresponds to a respective set of the sample of data points; determine a cluster constraint, wherein the cluster constraint relates to at least one of the one or more properties; select one or more candidate clusters from the plurality of candidate clusters, wherein the at least one property of each selected candidate cluster satisfies the determined cluster constraint, and wherein each data point from the sample of data points belongs to at most one of the one or more selected candidate clusters; and generate an output based on the one or more selected candidate clusters.

The client device may be any suitable computing device, such as a desktop computer, laptop computer, tablet computer, or smartphone. The client device may have a processor and a memory having computer-executable instructions stored thereon which, when executed by the processor, cause the client device to perform the disclosed steps.

The computer server may be any suitable computing system, which is configured to determine the plurality of candidate clusters and the information indicative of one or more properties of each candidate cluster, as discussed in more detail below. The computer server may be a remote server, such as a cloud server.

The client device may be configured to communicate with the computer server, i.e. so that it can receive data from, and transmit data to, the computer server. The client device and the computer server may be communicatively coupled via any suitable communication network, such as the internet, a wireless network (e.g. a Wi-Fi network or the like), or a wired network (e.g. an Ethernet network or the like).

The sample of data points may include a multitude (i.e. a plurality) of data points. The data points may correspond to points in a coordinate system (e.g. in a two-dimensional or three-dimensional coordinate system). Thus, the sample of data points may be provided as a series of data point coordinates, which comprises a set of coordinates for each data point in the sample.

The sample of data points may be a sample from a dataset comprising a plurality of data points stored at the computer server. Thus, the sample of data points received at the client device may correspond to a subset (or subsample) of the complete dataset that is stored at the computer server. In this manner, the complete dataset need not be transmitted to, and stored at, the client device. This may reduce an amount of memory required at the client device, as well as reduce an amount of data that needs to be transmitted from the computer server to the client device.

The information indicative of the plurality of candidate clusters may indicate one or more candidate clusters that correspond to the sample of data points (and likewise to the plurality of data points stored at the computer server). For example, the information may indicate, for each candidate cluster, which data points in the sample of data points belong to that candidate cluster.

Herein, a cluster may generally refer to a group of data points. A candidate cluster may correspond to a group of data points from the sample of data points (and likewise from the plurality of data points stored at the computer server), that is a possible clustering result for the data points. A given data point may belong to multiple candidate clusters, which may have different shapes and sizes (i.e. correspond to different numbers of data points).

The information indicative of one or more properties of each candidate cluster may comprise a set of one or more properties for each candidate cluster. The information indicative of the one or more properties may indicate a value of each of the one or more properties, for each candidate cluster. The one or more properties may relate to any properties or parameters of the candidate clusters that may be used to characterise the candidate clusters. As an example, the one or more properties may comprise one or more of: a number of data points in the candidate cluster, a skew of the candidate cluster, a circularity of the candidate cluster, a density of the candidate cluster, an area of the candidate cluster, a volume of the candidate cluster, a radius of gyration of the candidate cluster, and/or a length of the candidate cluster. Other properties of the candidate clusters are also possible. Thus, for instance, the information received by the client device may indicate the number of data points in each candidate cluster, and the radius of gyration of each candidate cluster. These properties may be determined for the candidate clusters using conventional calculation techniques. All of the properties of the candidate clusters are computed by the computer server, using the complete dataset stored at the computer server. As the client device does not itself need to calculate properties of the candidate clusters, it may not need access to the complete dataset, such that only a sample of the plurality of data points stored at the computer server need be transmitted to the client device.

A skew of the candidate cluster may correspond to a ratio of a major axis to a minor axis for that candidate cluster. A circularity of a candidate cluster may correspond to a measure of circularity of the candidate cluster (e.g. where a value of 1 corresponds to a circle, and lower values are assigned to more irregularly shaped clusters). A density of a candidate cluster may correspond to a number of data points in the candidate cluster divided by an area of the cluster (where the data points are in a two-dimensional space) or by a volume of the cluster (where the data points are in a three-dimensional space). An area of a candidate cluster may correspond to an area over which the candidate cluster extends, and may be computed, for example, from a convex hull of the candidate cluster. An area of the candidate cluster my alternatively correspond to a discretised area, e.g. where the candidate cluster's are is measured based on binning its data points into pixels. A radius of gyration of a candidate cluster may correspond a radial distance to a point which would have a moment of inertia that is the same as the candidate cluster's actual mass distribution, if the total mass of the candidate cluster were concentrated at that point (e.g. assuming each data point in the candidate cluster has a unit mass). A length of a candidate cluster may correspond to a length of a longest axis of the candidate cluster.

Following receipt of the sample of data points, information indicative of the plurality of candidate clusters, and information indicative of the one or more properties of each candidate cluster, the client device determines a cluster constraint. The cluster constraint may act as a constraint for at least one of the properties of the candidate clusters, such that candidate clusters which do not satisfy the cluster constraint are not selected. In this manner, candidate clusters which do not fulfil the cluster constraint can easily be rejected, which may facilitate selecting one or more of the candidate clusters. In some cases, this may serve to reduce a processing load on the client device for selecting the one or more candidate clusters, as the client device can effectively disregard any candidate clusters which do not satisfy the cluster constraint.

The client device may be configured to, for each candidate cluster, compare the at least one property to the cluster constraint, to determine if that candidate cluster satisfies the cluster constraint. If the candidate cluster does not satisfy the cluster constraint, it may be rejected (i.e. it is not selected). The client device may then be configured to select one or more candidate clusters from the remaining candidate clusters, i.e. those which have been determined to satisfy the cluster constraint. For example, the cluster constraint may correspond to a minimum length for the candidate clusters. Then, each candidate cluster which has a length that is less than the minimum length may be rejected, and the client device may select one or more candidate clusters from the remaining candidate clusters (i.e. those having a length longer than the minimum length).

In some cases, the cluster constraint may relate to multiple properties of the candidate clusters, i.e. a constraint may be determined for one or more of the properties of the candidate clusters. For example, the cluster constraint may relate to the number of data points in the candidate clusters, and the length of the candidate clusters (or any other combination of properties of the candidate clusters for which information is received from the computer server).

The cluster constraint may correspond to a value (e.g. a threshold value) or range of values for at least one of the properties of the candidate clusters. For example, where the cluster constraint corresponds to a range of values for the at least one property, candidate clusters whose at least one property does not have a value within the range of values may be rejected.

The cluster constraint may be determined in any suitable manner. In some cases, the client device may be configured to automatically determine the cluster constraint, or the client device may be configured with a default cluster constraint. Additionally or alternatively, the cluster constraint may be determined based on a user input made at the client device, as discussed below.

Once the cluster constraint is determined, the client device selects one or more candidate clusters from the plurality of candidate clusters. As noted above, this step may include rejecting candidate clusters where their at least one property does not satisfy the cluster constraint. The one or more candidate clusters may then be selected from the remaining candidate clusters. Various methods may be used for selecting the one or more candidate clusters, which provide an optimal selection of candidate clusters in view of the determined cluster constraint, some of which are discussed below.

The one or more candidate clusters are selected such that each data point from the sample of data points belongs to at most one of the one or more selected candidate clusters. In other words, a data point can only appear in a single selected candidate cluster. Thus, the one or more selected candidate clusters correspond to mutually exclusive sets of data points. This may avoid selecting overlapping or conflicting candidate clusters. However, it should be noted that not every data point need necessarily appear in one of the selected candidate clusters.

Once the one or more candidate clusters have been selected, the client device generates an output based on the selected candidate clusters. The generated output may take various forms. For example, the client device may be configured to store data indicative of the one or more selected candidate clusters, and/or the client device may be configured to display information indicative of the one or more selected candidate clusters. In this manner, a user of the client device may be informed of the candidate clusters, and can perform further analysis of the data points based on the clustering result. This may also enable the user to assess whether the clustering result is acceptable, or whether the data points need to be re-clustered, in which case a new cluster constraint may be determined and another set of candidate clusters may be selected. As the candidate clusters and their properties are stored in the client device, the client device can easily re-run the clustering process (e.g. by determining a new cluster constraint and selecting a new set of candidate clusters), thus enabling substantially real-time clustering of the data points. In particular, given that the candidate clusters and their properties are pre-computed, the data points can be re-clustered with different cluster constraints at the client device, without having to each time compute new candidate clusters. Displaying information indicative of the one or more selected candidate clusters may include displaying various types of information. For example, such information may include histograms, and/or scatter plots which may show features relating to the selected candidate clusters (e.g. number of data points per candidate cluster vs. area of all selected candidate clusters). Information about a selected candidate cluster may be displayed in a window (e.g. tooltip) when a user hovers a cursor over the selected candidate cluster.

The client device may be configured to perform the processes of determining the cluster constraint, selecting the one or more candidate clusters and generating an output may in a browser (i.e. a web browser) of the client device. In particular, as these processes may not be particularly resource intensive (in comparison with computing the candidate clusters and their properties), they may not require specialised software and can be performed in a conventional browser. A suitable script or algorithm may be loaded into the browser to enable the browser to perform the desired processes. For example, the client device may receive (e.g. download) the script or algorithm from the computer server.

The client device may be configured to determine the cluster constraint based on a user input received at the client device. In this manner, a user may control the cluster constraint which is used for selecting the candidate clusters. The user input may be indicative of the cluster constraint, such that the user can directly set the cluster constraint. Thus, the user can adjust the cluster constraint, to see how this changes which of the candidate clusters are selected, so that they may arrive at an optimal clustering result. In view of the rapid data clustering which can be performed at the client device, this may enable a user to interactively cluster data substantially in real-time at the client device.

The client device may comprise a user interface for receiving the user input. The user interface may be provided by one or more buttons, a keypad, and/or a touchscreen.

The client device may be configured to display a user interface for receiving a user input, wherein the user interface is arranged to enable selection of a value or range of values for the at least one property, and wherein the client device is configured to determine the cluster constraint based on a value or range of values for the at least one property selected via the user interface. The user interface may be displayed on a display (or screen) of the client device. In some cases, the user interface may be displayed in a browser on the client device. The user interface may be generated based on the information indicative of one or more properties of each candidate cluster that is received from the computer server. In this manner, the user interface may be tailored to the available properties, so that the user can select relevant cluster constraints. For example, if the information indicative of one or more properties of each candidate cluster relates to a length of the candidate clusters and a radius of gyration of the candidate clusters, the user interface may be generated to enable the user to select a value or range of values for the length of the candidate clusters, and a value or range of values for the radius of gyration of the candidate clusters.

The user interface may be provided as a website, which is hosted at a remote server. The website may be hosted at the computer server where the plurality of data points are stored, or it may be hosted at another remote server, separate to the above-mentioned computer server. The website may be accessed by the client device using a Uniform Resource Locator (URL). As an example, the user interface may be provided by an application (such as a JavaScript application) which is hosted at the remote server.

Advantageously, the properties of the candidate clusters may be easily interpretable by a user, even if they are not a specialist in the field of data clustering. Thus, by enabling a user to set a cluster constraint in terms of a property of the candidate clusters, a user who is not a specialist in the field of data clustering may easily perform a clustering process on a dataset. In contrast, with conventional techniques such as HDBSCAN, a user must set parameters of the algorithm which are less easily interpretable, as they do not relate directly to cluster properties. Accordingly, a good knowledge of clustering algorithms is required in order to make use of such algorithms, which may limit their adoption.

The client device may be configured to, for each data point in the sample of data points: determine if the data point is part of one of the selected candidate clusters or not; and assign a label to the data point based on the determination. The labels may correspond to the output that is generated by the client device. In this manner, each data point in the sample may be labelled depending on whether it belongs to a selected candidate cluster, and if so, which selected candidate cluster it belongs to. This may facilitate identifying data points in terms of the selected candidate clusters, which may facilitate further analysis and visualisation of the selected clusters. For example, if a data point is determined to be part of one of the selected candidate clusters, that data point may be assigned a label identifying the selected candidate cluster that it is part of. On the other hand, if a data point is determined to not be part of one of the selected candidate clusters, that data point may be assigned a label indicating that it is not part of the one or more selected candidate clusters.

The client device may be further configured to display the sample of data points and their assigned labels. This may provide a visual indication of which candidate clusters the data points belong to. Each data point may be displayed together with its assigned label. As an example, the assigned label for a data point may comprise a colour, which depends on whether the data point is part of one of the selected candidate clusters, and if so, on which selected candidate cluster it is part of. Then, each data point may be displayed with a colour according to its assigned label. Thus, data points which belong to different candidate clusters will be displayed with different colours, which may enable the different candidate clusters to be easily distinguished and visualised.

The client device may be further configured to receive, from the computer server, information indicative of a stability of each of the plurality of candidate clusters, and to select the one or more candidate clusters from the plurality of candidate clusters by: rejecting any of the plurality of candidate clusters whose at least one property does not satisfy the determined cluster constraint; and selecting one or more of the remaining candidate clusters, such that a sum of the stabilities of the selected one or more of the remaining candidate clusters is maximised. In this manner, an optimal set of candidate clusters may be selected, which satisfy the determined cluster constraint. In particular, by maximising the sum of the stabilities of the selected clusters, the one or more selected clusters may correspond to a selection of clusters which satisfy the cluster constrain whilst being optimally stable with respect to noise and/or splitting. The candidate clusters whose at least one property does not satisfy the determined cluster constraint may be rejected, for example, by setting their stabilities to zero, such that they are not selected. Herein, a stability of a cluster may be a numerical value which is a measure of a stability of that cluster against splitting into smaller clusters. In one example, a minimum spanning tree may be defined for the dataset comprising the plurality of data points. Then, the stability of a cluster may be measure of a stability of that cluster against splitting into smaller clusters, as a longest edge (i.e. the edge having the largest weight) of the minimum spanning tree is iteratively removed.

As is commonly known, a minimum spanning tree is an edge-weighted graph that connects all of the points in a set of data points, without any cycles, and with a minimum total edge weight.

The information indicative of the plurality of candidate clusters may comprise a tree structure having a plurality of nodes in which each node represents a respective one of the plurality of candidate clusters, where the plurality of nodes are arranged such that: a root node of the tree structure represents a candidate cluster that corresponds to all of the data points in the sample of data points; and each child node of the tree structure represents a child candidate cluster that corresponds to a respective subset of a set of data points that corresponds to a parent candidate cluster, which is represented by a parent node for that child node. Such an organisation of the candidate clusters in a tree structure may facilitate processing the candidate clusters in order to select optimal candidate clusters, as the tree structure makes clear the relationship between parent and child candidate clusters. Herein, a tree structure may refer to a hierarchical data structure having a plurality of nodes, where each node may have one or more child nodes.

As an example, the tree structure may be a binary tree. A binary tree is a tree structure where each node has at most two children. In this case, each node of the binary tree may have exactly two child nodes or zero child nodes. Thus, a parent node in the binary tree, which represents a parent candidate cluster, may have two child nodes, each representing a respective child candidate cluster. The two child candidate clusters may be formed by splitting the parent candidate cluster, such that each child candidate cluster comprises a respective subset of the data points of the parent candidate cluster.

In other examples, other types of tree structures may be used for storing the parent-child relationships of the candidate clusters.

The client device may be configured to, for each node in the tree structure: determine if the stability of the candidate cluster represented by that node is greater than a sum of stabilities of candidate clusters represented by any child nodes of that node and, if so, select the candidate cluster represented by that node. Thus, a candidate cluster may only be selected if it has a greater stability than the sum of the stabilities of its child nodes. Such a process of selecting candidate clusters may facilitate maximising the sum of the selected one or more candidate clusters.

In some embodiments, the sample of data points may be a sample from a dataset comprising a plurality of data points stored at the computer server, where a minimum spanning tree connects the plurality of data points, wherein the information indicative of the one or more properties comprises, for each of the plurality of candidate clusters, an indication of an upper bound for edge weights of a edges of the minimum spanning tree in that candidate cluster, and wherein the client device is further configured to: determine, as the cluster constraint, a distance parameter; reject any of the plurality of candidate clusters for which the upper bound is greater than the distance parameter; and select one or more of the remaining candidate clusters. According to this technique, if a candidate cluster includes data points between which an edge of the minimum spanning tree has a weight that is greater than the distance parameter, then that candidate cluster is rejected. As a result, only candidate clusters corresponding to data points between which edges of the minimum spanning tree are shorter than the distance parameter remain and are selected from. This may ensure that only denser, less spread-out candidate clusters are selected. This may provide a similar result to the DBSCAN* clustering technique, which involves deleting edges from the minimum spanning tree that are longer than a selected distance parameter, and selecting clusters from the remaining groups of connected data points. The upper bound for edge weights of edges of the minimum spanning tree in a candidate cluster may be determined (e.g. at the computer server) such that all edges of the minimum spanning tree in the candidate cluster have weights equal to, or less than, the upper bound.

The client device may further be configured to: display data points within a field of view; transmit, to the computer server, an indication of a current field of view displayed by the client device; and receive a sample of data points from the computer server, wherein the sample of data points corresponds to the current field of view. In this manner, the client device may only receive data points corresponding to the current field of view. This may avoid the client device receiving and storing a large number of data points which are not displayed, thus reducing a burden on the client device's resources. As noted above, as the candidate clusters and their properties are pre-computed, there may be no need for the client device to hold all of the data points in memory. The indication of the current field of view displayed by the client device may include an indication of a range (or ranges) of coordinates that are currently displayed by the client device, e.g. by a screen of the client device. The computer server may then determine which of the plurality of data points stored at the server are located within the current field of view (e.g. by comparing the coordinates of the data points to the range of coordinates for the current field of view), and transmit a sample of data points corresponding to the current field of view to the client device.

The sample of data points may correspond to feature locations in a biological image. In other words, the data points may correspond to estimated (or detected) locations of features in a biological image. The biological image may be any suitable type of biological image, such as a picture (e.g. photograph) of a biological sample, or a fluorescence image of a biological sample. The biological image may be acquired via any suitable setup, including known types of microscopes. In one example, the data points correspond to estimated fluorophore positions in an image of a biological sample. For instance, the biological image may be a single-molecule localisation microscopy (SMLM) image, where the data points correspond to estimated fluorophore positions in the image. SMLM images may be obtained, for example, by fPALM, dSTORM or PAINT methods.

Of course, the present invention may be applied in fields other than biological imaging for performing a clustering analysis of data points. As an example, the present invention may be used for clustering and analysing geospatial data. Such geospatial data may, for instance, include locations of crimes in a city, locations of trees in an area, or locations of incidences of a disease. The invention may also be useful for any other clustering application, for example in machine learning for classification of data points in a latent space.

According to a second aspect of the invention, there is provided a computer server configured to: store a dataset comprising a plurality of data points; determine a plurality of candidate clusters for the plurality of data points, where each candidate cluster corresponds to a respective set of the plurality of data points; determine, for each candidate cluster, one or more properties of that candidate cluster; and transmit, to a client device, a sample of the plurality of data points, information indicative of the plurality of candidate clusters, and information indicative of the one or more properties determined for each candidate cluster.

The computer server may be any suitable computing system. In some examples, the computer server may be a remote server, e.g. such as a cloud server. The cloud server may comprise a processor and a memory having computer-executable instructions stored thereon which, when executed by the processor, cause the client device to perform the disclosed steps.

The computer server may be configured to communicate with the client device, i.e. so that it can transmit data to, and receive data from, the client device. The computer server and client device may be communicatively coupled via any suitable communication network, such as the internet, a wireless network (e.g. a Wi-Fi network or the like), or a wired network (e.g. an Ethernet network or the like).

The computer server of the second aspect of the invention may be configured to communicate with the client device of the first aspect of the invention. Thus, any features discussed above in relation to the first aspect of the invention, in particular relating to the computer server, communications between the computer server and the client device and data that is shared between the computer server and the client device, may be applied to the second aspect of the invention. Likewise, features mentioned in relation to the second aspect of the invention may be shared with the first aspect of the invention.

The dataset comprising a plurality of data points may be stored in a memory of the computer server. The dataset may be received from any suitable source. For example, a user may upload the dataset to the computer server. Alternatively, the plurality of data points may be determined by the computer server, based on a set of raw data that is provided to the computer server, i.e. the computer server may be configured to determine the plurality of data points from the raw data. As an example, the raw data may be in the form of an image. The computer server may then apply a feature detection algorithm to the image, in order to obtain a plurality of data points corresponding to the image.

As mentioned in relation to the first aspect of the invention, the plurality of data points may correspond to feature locations in a biological image. For example, the data points correspond to detected fluorophore positions in an image of a biological sample.

The data points may correspond to points in a coordinate system (e.g. in a two-dimensional or three-dimensional coordinate system). Thus, the plurality of data points may be stored as a series of data point coordinates, which comprises a set of coordinates for each data point.

The computer server is configured to determine a plurality of candidate clusters for the plurality of data points. A candidate cluster may correspond to a group of data points from the plurality of data points, which is a possible clustering result for the data points. A given data point may belong to multiple candidate clusters, which may have different shapes and sizes (i.e. correspond to different numbers of data points). The computer server may be configured to determine the plurality of candidate clusters such that each of the plurality of candidate clusters corresponds to a respective subset of the plurality of data points, such that each subset of the plurality of data points comprises more than a predetermined number of data points. In other words, each candidate cluster may have at least a predetermined number of data points. For example, the predetermined number may be 10, 15, or 20. The predetermined number may be selected based on the specific application, and the nature of the data points (e.g. what they represent).

The computer server is configured to determine one or more properties for each of the plurality of candidate clusters. As mentioned in relation to the first aspect of the invention, the one or more properties may relate to any properties or parameters of the candidate clusters that may be used to characterise the candidate clusters. As an example, the one or more properties may comprise one or more of: a number of data points in the candidate cluster, a skew of the candidate cluster, a circularity of the candidate cluster, a density of the candidate cluster, an area of the candidate cluster, a volume of the candidate cluster, a radius of gyration of the candidate cluster, and/or a length of the candidate cluster. Other properties of the candidate clusters are also possible.

The one or more properties for each candidate cluster may be calculated using the coordinates of the data points that belong to that cluster.

The computer server may further be configured to determine a stability of each of the plurality of candidate clusters, and to transmit information indicative of the determined stability of each candidate cluster to the client device.

The computer server may be configured to determine the plurality of candidate clusters by applying a clustering algorithm to the plurality of data points. The computer server may use various known clustering algorithms or techniques for determining the plurality of candidate clusters for the plurality of data points. In one example, the computer server may implement a technique like that used in the HDBSCAN algorithm for determining the plurality of candidate clusters. The HDBSCAN algorithm determines a plurality of candidate clusters by first constructing a minimum spanning tree for the plurality of data points, and generating pairs of candidate clusters by successively (i.e. iteratively) removing a longest edge in the minimum spanning tree, where each candidate cluster corresponds to more than a predetermined number of data points.

Thus, in some embodiments, the computer server may be configured to determine a plurality of candidate clusters by: constructing a minimum spanning tree for the plurality of data points; defining a root candidate cluster that corresponds to all of the data points in the plurality of data points; iteratively removing a longest edge in the minimum spanning tree; and if removing the longest edge results in two groups of connected data points, each comprising more than a predetermined number of data points, defining each group of connected data points as a candidate cluster.

The computer server may be configured to determine, as one of the one or more properties for each of the plurality of candidate clusters, an upper bound for edge weights of edges of the minimum spanning tree between data points corresponding to that candidate cluster. In particular, each candidate cluster may correspond to a group of data points which are connected by edges of the minimum spanning tree. The computer server may thus determine, for each candidate cluster, an edge of the minimum spanning tree that extends between points of that candidate cluster, and which has a greatest weight. Determining such a property for the candidate clusters may facilitate selecting the one or more candidate clusters at the client device. In some cases, the upper bound for a candidate cluster may be defined as the weight of an edge of a parent candidate cluster, which when removed from the minimum spanning tree results in the creation of that candidate cluster, together with another child candidate cluster.

The computer server may be configured to generate a tree structure (e.g. a binary tree) having a plurality of nodes, in which each node represents a respective one of the plurality of candidate clusters, where the plurality of nodes are arranged such that: a root node of the tree structure represents a root candidate cluster that corresponds to all of the data points in the plurality of data points; and each child node of the tree structure represents a child candidate cluster that corresponds to a subset of a set of data points that corresponds to a parent candidate cluster, which is represented by a parent node for that child node; and wherein the information indicative of the plurality of candidate clusters comprises the tree structure. The structure of the tree structure may be as discussed above in relation to the first aspect of the invention.

Such a tree structure (e.g. a binary tree) may be produced as part of the process for determining the plurality of candidate clusters, e.g. as part of the HDBSCAN algorithm. For example, where the tree structure is a binary tree, the binary tree may be constructed starting at the root node. Then, a pair of child nodes may be added to the binary tree each time removing the longest edge in the minimum spanning tree results in a new pair of candidate clusters being defined. Thus, as the minimum spanning tree is progressively split into smaller candidate clusters, the candidate clusters may be added to the binary tree as corresponding child nodes.

The sample of the plurality of data points transmitted by the computer server to the client device may a subsample of the plurality of data points. Indeed, as discussed above, as the plurality of candidate clusters and their properties are determined at the computer server, there may be no need to provide the entire dataset to the client device. Accordingly, only a subsample of the plurality of data points may be transmitted to the client device, thus reducing an amount of data that is transmitted to the client device, and an amount of memory taken up at the client device. The subsample of data points may comprise a fraction (i.e. a portion) of the plurality of data points. Any suitable subsampling technique may be used, for selecting a subsample of the plurality of data points for transmission to the client device. As an example, a uniform random subsampling technique may be used. Such a technique may be particularly effective as it may avoid any sampling bias that might alter the distribution of the sample of data points depending on the number of data points sampled. Another subsampling technique may involve merging together data points that are close to one another, e.g. where 'close' may be defined based on a pixel size of a display at the client device. This may requires one or more rules as to how data points can be merged together, in order to avoid loss of information. The inventors have found that a sampling rate of approximately 5% may be suitable, to enable a good visualisation of the data points and clusters at the client device. So, for a dataset containing 1 million data points, the sample transmitted to the client device may contain about 50,000 data points.

The computer server may further be configured to: receive, from the client device, an indication of a current field of view displayed by the client device; and transmit the sample of data points to the client device, wherein the sample of data points corresponds to the current field of view. In this manner, the computer server may only transmit data points to the client device which correspond to the current field of view displayed at the client device. Then, the client device can display the sample of data points, without having to receive and store data points which are located outside the current field of view. The sample of data points transmitted to the client device may correspond to a subsample of the plurality of data points located in the field of view. In other words, a subsampling technique may be applied to the data points located within the field of view, to further reduce the number of data points transmitted to the client device.

Together, the client device of the first aspect of the invention and the computer server of the second aspect of the invention may form a system for clustering data points. Thus, according to a third aspect of the invention there is provided a system for clustering data points, the system comprising a computer server and a client device, wherein the computer server is configured to: store a dataset comprising a plurality of data points; determine a plurality of candidate clusters for the plurality of data points, where each candidate cluster corresponds to a respective set of the plurality of data points; determine, for each candidate cluster, one or more properties of that candidate cluster; and transmit, to the client device, a sample of the plurality of data points, information indicative of the plurality of candidate clusters, and information indicative of the one or more properties determined for each candidate cluster; wherein the client device is configured to: receive the sample of data points, information indicative of the plurality of candidate clusters, and information indicative of the one or more properties determined for each candidate cluster, from the computer server; determine a cluster constraint, wherein the cluster constraint relates to at least one of the one or more properties of each candidate cluster; select one or more candidate clusters from the plurality of candidate clusters, wherein the at least one property of each selected candidate cluster satisfies the determined cluster constraint, and wherein each data point from the sample of data points belongs to at most one of the one or more selected candidate clusters; and generate an output based on the one or more selected candidate clusters. Any of the features discussed above in relation to the first and second aspects of the invention may be shared with the system of the third aspect of the invention.

According to a fourth aspect of the invention, there is provided a method of clustering data points at a client device, the method comprising, at the client device: receiving, from a computer server, a sample of data points, information indicative of a plurality of candidate clusters, and information indicative of one or more properties of each candidate cluster, wherein each candidate cluster corresponds to a respective set of the sample of data points; determining a cluster constraint, wherein the cluster constraint relates to at least one of the one or more properties of each candidate cluster; selecting one or more candidate clusters from the plurality of candidate clusters, wherein the at least one property of each selected candidate cluster satisfies the determined cluster constraint, and wherein each data point from the sample of data points belongs to at most one of the one or more selected candidate clusters; and generating an output based on the one or more selected candidate clusters. The method of the fourth aspect of the invention may be performed using the client device of the first aspect of the invention, and therefore any features discussed above in relation to the first aspect of the invention may be included in the method of this aspect.

The method may further comprise determining the cluster constraint based on a user input received at the client device.

The method may further comprise generating a user interface for receiving a user input, wherein the user interface is arranged to enable selection of a value or range of values for the at least one property, and the determining of the cluster constraint may be based on a value or range of values for the at least one property selected via the user interface.

The method may further comprise displaying information indicative of the one or more selected candidate clusters.

The method may further comprise, for each data point in the sample of data points: determining if the data point is part of one of the selected candidate clusters or not; and assigning a label to the data point based on the determination.

The method may further comprise displaying the sample of data points and their assigned labels.

The method may further comprise receiving, from the computer server, information indicative of a stability of each of the plurality of candidate clusters, and selecting the one or more candidate clusters from the plurality of candidate clusters by: rejecting any of the plurality of candidate clusters whose at least one property does not satisfy the determined cluster constraint; and selecting one or more of the remaining candidate clusters, such that a sum of the stabilities of the selected one or more of the remaining candidate clusters is maximised.

The information indicative of the plurality of candidate clusters may comprise a tree structure having a plurality of nodes in which each node represents a respective one of the plurality of candidate clusters, where the plurality of nodes are arranged such that: a root node of the tree structure represents a candidate cluster that corresponds to all of the data points in the sample of data points; and each child node of the tree structure represents a child candidate cluster that corresponds to a respective subset of a set of data points that corresponds to a parent candidate cluster, which is represented by a parent node for that child node.

The method may further comprise, for each node in the tree structure: determining if the stability of the candidate cluster represented by that node is greater than a sum of stabilities of candidate clusters represented by any child nodes of that node and, if so, selecting the candidate cluster represented by that node.

The sample of data points may be a sample from a dataset comprising a plurality of data points stored at the computer server, where a minimum spanning tree connects the plurality of data points, wherein the information indicative of the one or more properties comprises, for each of the plurality of candidate clusters, an indication of an upper bound for edge weights of edges of the minimum spanning tree in that candidate cluster, and wherein the method comprises: determining, as the cluster constraint, a distance parameter; rejecting any of the plurality of candidate clusters for which the upper bound is greater than the distance parameter; and selecting one or more of the remaining candidate clusters.

The method may further comprise: displaying data points within a field of view; transmitting, to the computer server, an indication of a current field of view displayed by the client device; and receiving a sample of data points from the computer server, wherein the sample of data points corresponds to the current field of view.

According to a fifth aspect of the invention, there is provided a method of processing a dataset, the method comprising, at a computer server: storing a dataset comprising a plurality of data points; determining a plurality of candidate clusters for the plurality of data points, where each candidate cluster corresponds to a respective set of the plurality of data points; determining, for each candidate cluster, one or more properties of that candidate cluster; and transmitting, to a client device, a sample of the plurality of data points, information indicative of the plurality of candidate clusters, and information indicative of the one or more properties determined for each candidate cluster. The method of the fifth aspect of the invention may be performed using the computer server of the second aspect of the invention, and therefore any features discussed above in relation to the second aspect of the invention may be included in the method of this aspect.

The method may further comprise determining the plurality of candidate clusters by: constructing a minimum spanning tree for the plurality of data points; defining a root candidate cluster that corresponds to all of the data points in the plurality of data points; iteratively removing a longest edge in the minimum spanning tree; and if removing the longest edge results in two groups of connected data points, each comprising more than a predetermined number of data points, defining each group of connected data points as a candidate cluster.

The method may further comprise determining, as one of the one or more properties for each of the plurality of candidate clusters, an upper bound for edge weights of edges of the minimum spanning tree between data points corresponding to that candidate cluster.

The method may further comprise generating a tree structure having a plurality of nodes, in which each node represents a respective one of the plurality of candidate clusters, where the plurality of nodes are arranged such that: a root node of the tree structure represents a root candidate cluster that corresponds to all of the data points in the plurality of data points; and each child node of the tree structure represents a child candidate cluster that corresponds to a subset of a set of data points that corresponds to a parent candidate cluster, which is represented by a parent node for that child node; and wherein the information indicative of the plurality of candidate clusters comprises the tree structure.

The method may further comprise: receiving, from the client device, an indication of a current field of view displayed by the client device; and transmitting the sample of data points to the client device, wherein the sample of data points corresponds to the current field of view.

The method may comprise determining one or more of the following properties for each candidate cluster: a number of data points in the candidate cluster, a skew of the candidate cluster, a circularity of the candidate cluster, a density of the candidate cluster, an area of the candidate cluster, a volume of the candidate cluster, a radius of gyration of the candidate cluster, and/or a length of the candidate cluster.

According to a sixth aspect of the invention, there is provided a method of clustering data points with a system comprising a computer server and a client device, the method comprising: storing a dataset comprising a plurality of data points; determining a plurality of candidate clusters for the plurality of data points, where each candidate cluster corresponds to a respective set of the plurality of data points; determining, for each candidate cluster, one or more properties of that candidate cluster; and transmitting, to the client device, a sample of the plurality of data points, information indicative of the plurality of candidate clusters, and information indicative of the one or more properties determined for each candidate cluster; wherein the client device is configured to: receiving the sample of data points, information indicative of the plurality of candidate clusters, and information indicative of the one or more properties determined for each candidate cluster, from the computer server; determining a cluster constraint, wherein the cluster constraint relates to at least one of the one or more properties of each candidate cluster; selecting one or more candidate clusters from the plurality of candidate clusters, wherein the at least one property of each selected candidate cluster satisfies the determined cluster constraint, and wherein each data point from the sample of data points belongs to at most one of the one or more selected candidate clusters; and generating an output based on the one or more selected candidate clusters. The method of the sixth aspect of the invention may be performed using the system according to the third aspect of the invention. Thus, any features discussed in relation to any of the previous aspects may be shared with this aspect of the invention.

SUMMARY OF THE FIGURES

Embodiments illustrating the principles of the invention will now be discussed with reference to the accompanying figures in which:

FIG. 3b is a schematic diagram of a minimum spanning tree corresponding to the plurality of data points of FIG. 3a;

FIG. 5a shows a table configured to store data relating to determined candidate clusters;

FIG. 5b shows a table configured to store data relating to a plurality of data points;

DETAILED DESCRIPTION OF THE INVENTION

Aspects and embodiments of the present invention will now be discussed with reference to the accompanying figures. Further aspects and embodiments will be apparent to those skilled in the art. All documents mentioned in this text are incorporated herein by reference.

Figure 1:
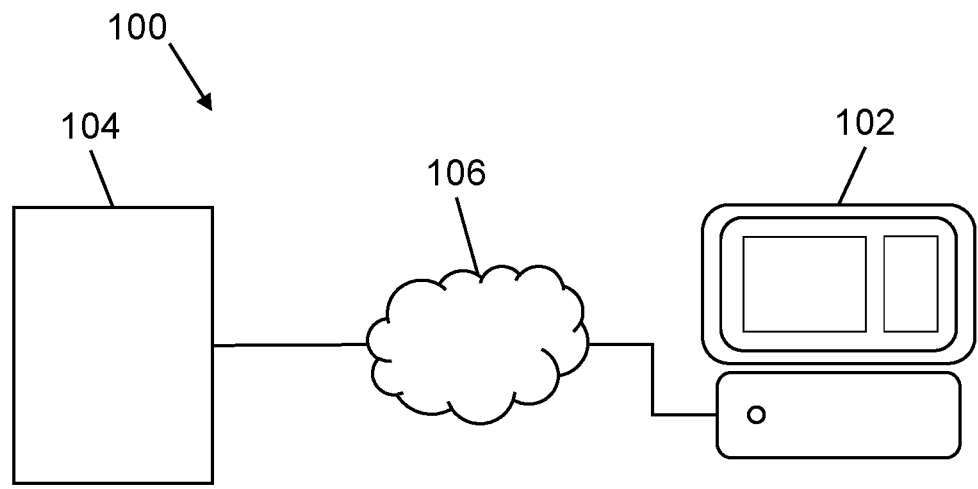
FIG. 1 is a schematic diagram of a system for clustering data points according to an embodiment of the invention.

FIG. 1 shows a schematic diagram of a data clustering system 100 according to an embodiment of the invention. The system 100 includes a client device 102 and a computer server 104 which are in communication with one another via a communication network 106. In the example shown, the client device 102 is a desktop computer, however in other examples the client device 102 may be implemented by other types of computing device, such as a laptop computer, tablet computer or smartphone. The client device 102 includes a display screen, as well as an input device (e.g. mouse, keyboard and/or touchscreen) for receiving inputs from a user. The computer server 104 may be implemented by any suitable computing system, and in one example may be in the form of a cloud server which is connected to the internet. The communication network 106 may comprise any suitable communication network(s), which enable transmission of data between the computer server 104 and the client device 102. Where the computer server 104 is a cloud server, the client device 102 and the computer server 104 may be in communication via the internet. Alternatively, the computer server 104 may be connected to a local network (e.g. a Local Area Network), in which case the client device 102 and the computer server 104 may be in communication via the local network. The computer server 104 is configured to store a dataset comprising a plurality of data points. The dataset may be stored in a memory of the computer server 104. The plurality of data points may, for example, be data points in a two-dimensional or a three-dimensional space. Thus, the dataset may be stored as a series of coordinates (in a two-dimensional or a three-dimensional space) corresponding to the plurality of data points.

The data points may have been obtained in different ways, depending on the context in which the invention is applied. In one example, each of the plurality of data points may be representative of a detected feature location in an image (e.g. the data point may correspond to coordinates of the detected feature in the image). The image may, for example, be an image of a biological sample, which may have been captured via any suitable means (e.g. using a camera, imaging microscope, and/or other imaging system). The image may have been subsequently analysed to determine the locations of features of interest in the image. The locations of features of interest in the image may be determined manually by a user based on a visual inspection of the image. Alternatively, the image may be analysed using image analysis software in order to automatically detect features which may be of interest. Various known feature recognition algorithms may be used for this purpose. In some embodiments, image data may be provided to the computer server 104, which is then configured to apply image analysis software to the image data in order to detect the locations of features which may be of interest, and store the detected locations as a plurality of data points. In other words, the dataset comprising the plurality of data points may be determined at the client server 104, based on received image data. Alternatively, the image may be analysed elsewhere to obtain the plurality of data points, which are then uploaded to the computer server 104.

In a particular example, a biological sample may be imaged via a fluorescence microscopy technique. For example, a biological sample may be imaged with a single-molecule localisation microscopy technique, although other fluorescence microscopy techniques may be used depending on the length scale of interest. Locations of fluorophores in the resulting image data may then be detected (either manually or with some image analysis software) and stored as a plurality of data points. In some cases, the software which is used to acquire the image data also produces a set of data points through a localisation process, which happens substantially in real-time, and produces a data file containing all of the data points. This file may then be uploaded (either manually by the user, or automatically) to the computer server 104, where it is converted into a format that is suitable for visualisation (e.g. enabling efficient subsampling and sub-region queries), and stored. Of course, the invention is not limited to being used with data points that are obtained from images of biological samples, and can be used in a variety of different applications. Indeed, the data points may be obtained from any suitable type of image, where it may be desirable to detect and analyse features in that image. In some cases, the data points may not come from a captured image, but are instead the result of a simulation (e.g. a simulation of a biological or physical system).

The computer server 104 is configured to compute a plurality (i.e. one or more) candidate clusters for the plurality of data points, each candidate cluster corresponding to a respective subset of the plurality of data points. The candidate clusters correspond to different ways in which the plurality of data points can be clustered (i.e. grouped) together, and may be computed using various clustering techniques. As an example, the computer server 104 may employ the method used in the HDBSCAN algorithm for computing the candidate clusters, as discussed in more detail below in relation to FIGS. 3a-3c and 4. The computer server 104 also computes a series of properties for each of the candidate clusters. Properties that may be calculated by the computer server 104 for each candidate cluster may include, for example, a number of data points in the candidate cluster, a skew of the candidate cluster, a circularity of the candidate cluster, a density of the candidate cluster, an area of the candidate cluster, a volume of the candidate cluster, a radius of gyration of the candidate cluster, and/or a length of the candidate cluster. To calculate these properties for each candidate cluster 104, the computer server 104 may use the coordinates for each of the data points in that candidate cluster, together with standard calculation techniques for obtaining these properties. For properties relating to a candidate cluster's shape, such as the area or circularity, the computer server 104 may need to determine a continuous shape (e.g. outline) corresponding to the candidate cluster. One way of doing this may be to fit an ellipse to the data points of the candidate cluster, with the major and minor axes of the ellipse being determined from a principal component analysis of the data points in the candidate cluster. Another way is to determine a convex hull for the data points in the candidate cluster. The length of a candidate cluster may be determined as a length of the major axis of the ellipse that was fitted for the candidate cluster, or alternatively the length of a candidate cluster may correspond to a maximum distance between any two data points in the candidate cluster.

Once the candidate clusters and their properties have been computed, the computer server 104 transmits to the client device 102 information (i.e. data) indicative of the plurality of candidate clusters, information indicative of the one or more properties determined for each candidate cluster, together with a sample of the plurality of data points. The sample of the plurality of data points may correspond to a subsample of the plurality of data points, such that only a portion of the dataset stored at the computer server 104 is transmitted to the client device 102. The computer server 102 may apply a subsampling algorithm to the plurality of data points, in order to select a sample of the plurality of data points for transmission to the client device 102.

Figure 2:
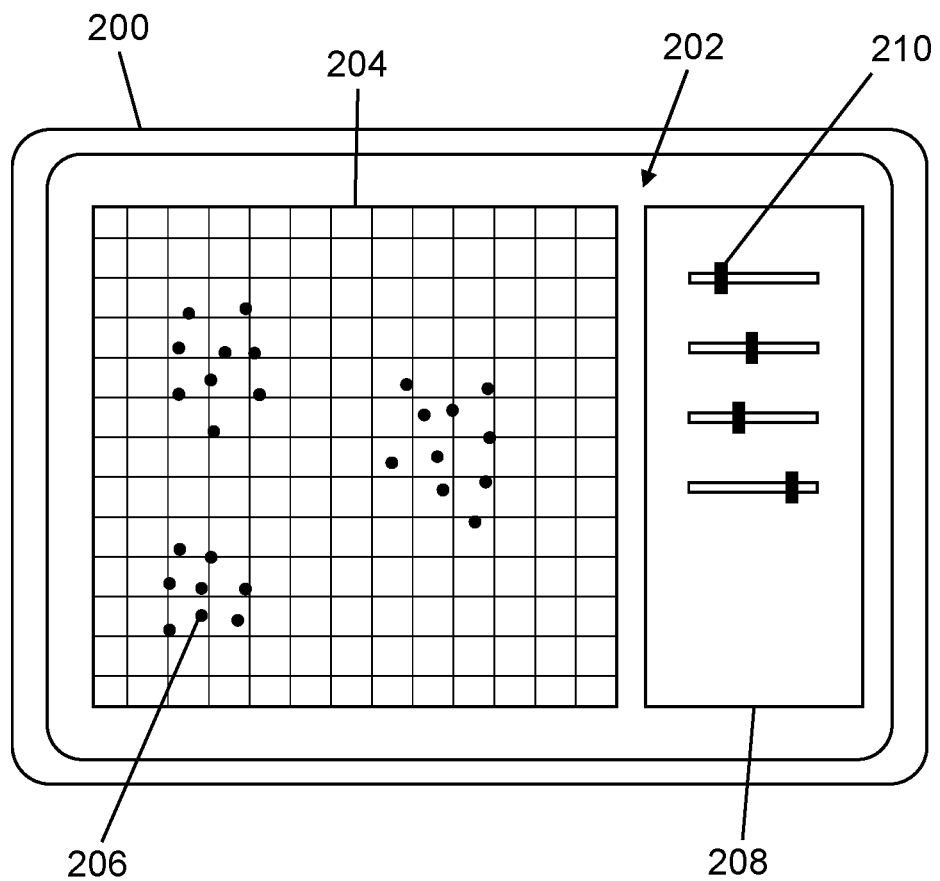
FIG. 2 is a schematic diagram of a user interface at a client device according to an embodiment of the invention.

Upon receipt of the data transmitted by the computer server 104, the client device 102 may generate a user interface which displays the received sample of data points, together with a control panel that enables a user to select one or more parameters for controlling clustering of the data points. FIG. 2 shows a schematic diagram of a user interface 202 that may be displayed on a screen of the client device 102. In some cases, the user interface 202 may be displayed in a web browser of the client device 102. For example, the user interface 202 may be provided by a website (e.g. which is hosted at the computer server 104 or at another remote server), and which is accessible via a Uniform Resource Locator (URL). As can be seen, the user interface 202 includes a display panel 204 in which the received data points 206 are plotted. In the example shown, the data points 206 are points in a two-dimensional space, such that they are plotted in a two-dimensional coordinate system. The user interface further includes a control panel 208, which is configured to receive inputs from the user. The control panel 208 is configured to enable the user to select a desired value or range of values, for each of the properties that were computed for the candidate clusters by the computer server 104. In this manner, a constraint may be set for each of the properties, which enables the client device to select one or more candidate clusters having desired properties, from among the plurality of candidate clusters. In the example shown, the control panel 208 includes a series of sliders 210, each of which the user can drag in order to set a desired value or range of values for a corresponding property. Of course, other means for receiving user inputs other than sliders 210 may be used. For instance, the control panel 208 may include fields for receiving numerical inputs, drop-down lists of possible values or ranges of values, or any other suitable means for receiving user inputs.

In the example of FIG. 2, there are four sliders 210, and each one may correspond to a different property of the candidate clusters. For example, the computer server 104 may have determined a series of four properties for each of the candidate clusters. Then, the control panel 208 may be generated such that it has a slider (or other suitable input means) for each of the properties. Where a large number of properties are determined for the candidate clusters, the control panel 208 may provide a drop-down list which enables the user to select properties for which constraints are to be set.

Using the control panel 208, the user can set a constraint for one or more of the properties that were determined for the candidate clusters. For example, the using the control panel 208, the user may set a minimum value for the number of data points in a candidate cluster, as well as a minimum value for an area of a candidate cluster. Together, the constraints set by the user may be determined as a cluster constraint by the client device 102, which is then used to select one or more of the candidate clusters. The client device 102 may also be programmed with a default cluster constraint, in case no constraints are selected by the user. The default cluster constraint may be used as an initial cluster constraint, in order to initiate the clustering process. Once the user has set one or more constraints via the control panel 208, or if the default cluster constraint is determined as the cluster constraint, the client device 102 is configured to select one or more candidate clusters from among the plurality of candidate clusters. To do this, the client device 102 may first reject any of the candidate clusters whose properties do not satisfy the determined cluster constraint. For instance, in the example mentioned above, the client device 102 may reject any candidate clusters having less than the minimum value of data points, and clusters whose area is less than the minimum value. Then, the client device 102 may select one or more clusters from the remaining clusters, such that all of the selected clusters satisfy the determined cluster constraint. Examples of how the one or more candidate clusters may be selected are discussed in more detail below.

Following the selection of the one or more candidate clusters by the client device 102, the client device 102 may be configured to assign a label to each of the sample of data points, based on whether the data point is part of a selected candidate cluster and, if so, which candidate cluster it is part of. Thus, the label assigned to each data point may indicate which of the selected candidate clusters it is part of, if any. All of the data points which belong to a same selected candidate cluster may be assigned an identical label, to facilitate identifying which selected candidate cluster they are part of. Then, the client device 102 may display (e.g. in the display panel 204 of the user interface 202) the sample of data points, together with their assigned labels. In this manner, the displayed data points and their labels may provide a visualisation of the selected candidate clusters. Any suitable types of labels may be assigned to the data points. For example a label for a data point may include an identifier which identifies which of the selected candidate clusters it is part of (if any).

In one example, the label for each of the sample of data points may comprise a colour, where the colour depends on whether the data point belongs to one of the selected colour, and if so, which of the selected candidate clusters the data point belongs to. Thus, each data point may be labelled with a colour which depends on which of the selected candidate clusters it is a part of (if any). For instance, if a data point does not belong to any of the selected candidate clusters, it may be labelled as grey, with other brighter colours (e.g. red, green, blue, yellow, etc.) being used as labels for data points in the selected candidate clusters. When the client device 102 displays the sample of data points, each data point may be coloured in accordance with its assigned label. This may enable the user to easily distinguish data points belonging to different candidate clusters. Of course, other types of visual indicators, other than colours, may be used to label the data points in order to identify which of the selected candidate clusters they belong to. For example, data points may be displayed as having different shapes (e.g. square, circle, cross, etc.) depending of which of the selected candidate clusters they belong to (if any).

The client device 102 may be configured to store data indicative of the of the one or more selected candidate clusters, as well as their assigned labels, so that the clustering result can be further reviewed and analysed. The client device 102 may also transmit such data to the computer server 104 for storage. Following the selection of the one or more candidate clusters, and the display of the results in the user interface 202, the user may prompt the client device 102 to perform a new candidate cluster selection process. In particular, the user may change the cluster constraint, by interacting with the control panel 208 in order to set one or more constraints for the properties of the candidate clusters. Once the user has set new constraints, the client device 102 may again select one or more of the candidate clusters whose properties satisfy the new constraints, and display the newly selected candidate clusters (e.g. by displaying the sample of data points with their assigned labels). In this manner, the user may interactively re-cluster the sample of data points substantially in real-time, e.g. until a desired clustering result is obtained. The process of re-clustering the sample of data points may be performed quickly and with a minimal burden on the resources of the client device 102, as all of the candidate clusters and their properties have been pre-computed by the computer server 104. In particular, this avoids having to compute a new set of candidate clusters each time the cluster constraint is changed, so that different clustering results can rapidly be determined and displayed at the client device 102.

In order to reduce an amount of data that is transmitted from the computer server 104 to the client device 102 and stored at the client device 102, the computer server 104 may be configured to only transmit data points to the client device 102 which are located within a current field of view that is displayed at the client device 102. Specifically, the display panel 204 in the user interface 202 may display a field of view which corresponds to a range of coordinates (e.g. in two-dimensional space), such that only data points which are located within the range of coordinates are shown in the display panel. The user interface 202 may enable a user to adjust the field of view, for example, by enabling them to adjust a zoom level and/or to navigate to different coordinates. The client device 102 may be configured to determine a current field of view that is displayed in the display panel 204 (e.g. to determine a range of coordinates corresponding to the current field of view), and to transmit data indicative of the current field of view to the computer server 104. Upon receipt of the data, the computer server 104 may determine a sample of data points from the plurality of data points stored at the computer server 104, based on the current field of view. The sample of data points is then transmitted to the client device 102. For example, the sample of data points may comprise only data points located within the current field of view. In some cases, the sample of data points may comprise data points located within the current field of view, as well as a region located around the field of view. This may enable slight adjustments to be made to the current field of view, without having to receive further data points from the computer server 104. Each time the field of view is adjusted at the client device 102, data indicative of the new field of view may be transmitted to the computer server 104, which may then respond by transmitting a sample of data points corresponding to the new field of view. In this manner, the user may view a sample of data points at the client device 102 corresponding to a current field of view, without having to store the entire dataset at the client device 102.

A process will now be described for determining a plurality of candidate clusters for a dataset comprising a plurality of data points, with reference to FIGS. 3a-3c and 4. This process may be performed, for example, by the computer server 104. The process for determining the candidate clusters may be similar to that used in the HDBSCAN algorithm. The process takes as an input parameter a parameter M (which is a positive integer), which corresponds to a minimum candidate cluster size, i.e. a minimum number of data points that must be in each candidate cluster.

Figure 3A:
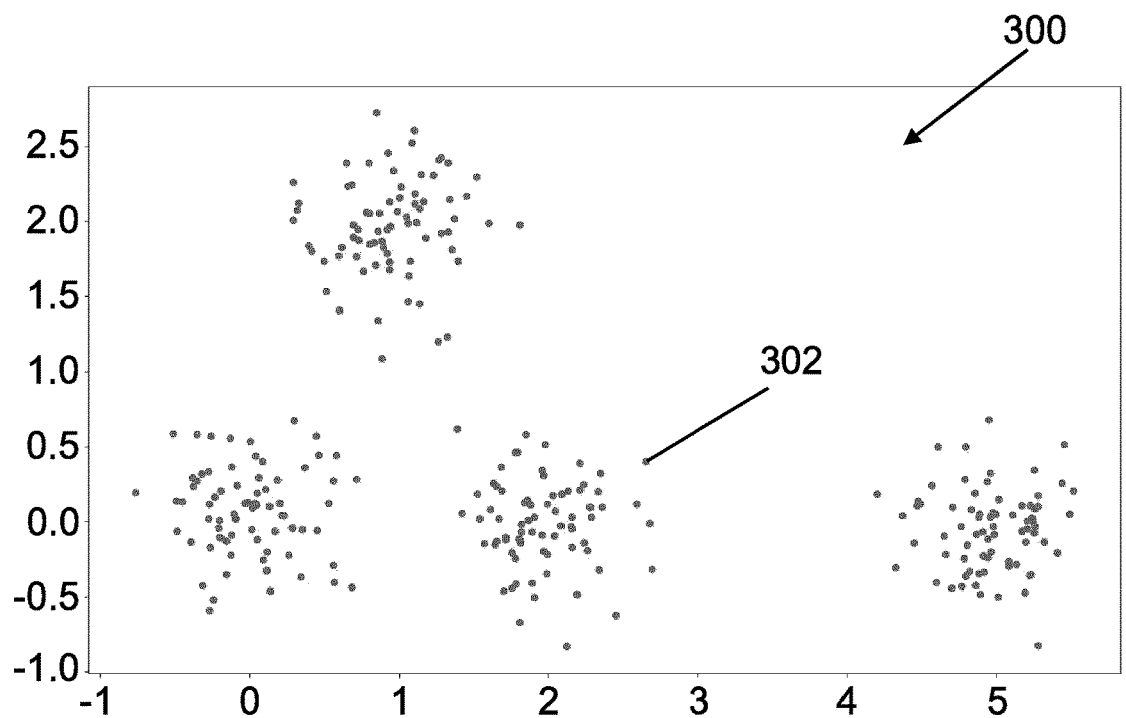
FIG. 3a is a schematic diagram of a plot of a plurality of data points that may be stored at a computer server that is an embodiment of the invention.
Figure 3B:
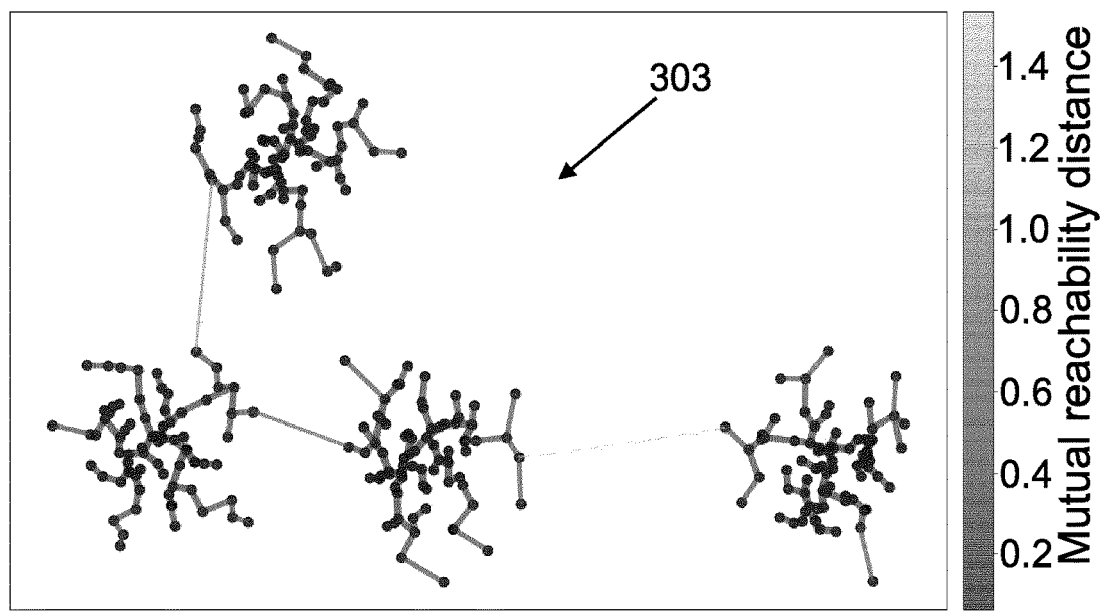

FIG. 3a shows a two-dimensional plot 300 of a plurality of data points 302. The plurality of data points 302 may form part of a dataset that is stored at the computer server 104. In a first step, a minimum spanning tree is constructed for the plurality of data points. Various known algorithms may be used for constructing the minimum spanning tree. In one example, Borůvka's algorithm may be used for constructing the minimum spanning tree. A distance metric is used for weighting the edges of the minimum spanning tree, such that the distance metric that weights an edge of the minimum spanning tree relates to a measure of a distance between data points that are connected by that edge. In a preferred example, a mutual reachability distance, which is defined by a mutual reachability parameter 'k' may be used as the distance metric for weighting the edges of the minimum spanning tree. The mutual reachability distance $d_{reach,k}(a, b)$ between a data point 'a' and a data point 'b', with a mutual reachability parameter k, may be defined as:

$$d_{reach,k}(a,b)=\max\{core_k(a),core_k(b),d(a,b)\} \quad (1)$$

where d(a, b) is a metric distance between points 'a' and 'b', $core_k(a)$ is a distance from point 'a' to its k-th nearest neighbour, and $core_k(b)$ is a distance from point b' to its k-th nearest neighbour (k being a positive integer). Thus, where the mutual reachability distance is used as the distance metric for the minimum spanning tree, the process of determining the candidate clusters further takes the value of k as an input parameter. FIG. 3b shows an example of a minimum spanning tree 303 that was determined for the plurality of data points 302 using Borůvka's algorithm. Each edge of the minimum spanning tree 303 is weighted according to the mutual reachability distance between the points it connects. The shading of the edges in the minimum spanning tree 303 in FIG. 3b are indicative of a value of their mutual reachability distance, as shown by the colour bar in FIG. 3b.

In a second step, following the construction of the minimum spanning tree for the plurality of data points, a binary tree representing a plurality of candidate clusters for the plurality of data points is constructed. To start, a root candidate cluster 304 is defined as a candidate cluster corresponding to all of the plurality of data points. The root candidate cluster 304 is depicted by the dashed line in FIG. 3c, which surrounds the plurality of data points 302. A root node of the binary tree is then defined, which represents the root candidate cluster 304. Then, an iterative process is performed, for determining further candidate clusters. The iterative process comprises the following steps:

Remove the edge having the largest weight (i.e. the largest mutual reachability distance), denoted 'd', from the minimum spanning tree, and i) if removing the edge results in two groups of connected data points (i.e. where the data points in each group are connected by remaining edges of the minimum spanning tree), where each group has more than M data points, define each group of connected points as a respective child candidate cluster. A pair of child nodes is added to the binary tree, each representing one of the child candidate clusters. The child nodes in the binary tree are children of a parent node which represents a "parent" candidate cluster of the two child candidate clusters, where the parent candidate cluster comprises the data points of both child candidate clusters. In other words, the two child candidate clusters are obtained by removing the edge in the minimum spanning tree to split the parent candidate cluster into the child candidate clusters. A value of a 'distanceDeath' parameter of the parent candidate cluster is set to A value of a 'distanceBirth' parameter for each of the two child candidate clusters is set to 'd'.

ii) if removing the edge results in a first group of connected data points having more than M data points, and a second group of connected data points having fewer than M data points, then neither group of data points is added as a candidate cluster. A value of a parameter 'distanceBleed' for each of the data points in the second group of data points is set to 'd', and the data points in the second group of data points are removed from the minimum spanning tree. Additionally, a value of a parameter 'parentID' for each of the data points in the second group of data points is set to a unique value identifying a parent candidate cluster for those data points, where the parent candidate cluster comprises the data points of both candidate clusters, and included the edge of the minimum spanning tree that was removed to produce the two groups of data points. Each candidate cluster may be assigned a unique identifier.

iii) if removing the edge results in two groups of connected data points, each having fewer than M data points, a value of a parameter 'distanceBleed' for each of the data points in both groups is set to 'd'. A value of a parameter 'parentID' for each of the data points in the two groups is set to a unique value identifying a parent candidate cluster for those data points, where the parent candidate cluster comprises the data points of both candidate clusters, and included the edge of the minimum spanning tree that was removed to produce the two groups of data points. The data points in both groups of data points are removed from the minimum spanning tree. Additionally, a value of a parameter 'distanceDeath' is set to for the parent candidate cluster.

The above procedure is iteratively repeated until all of the data points have been removed from the minimum spanning tree. At the end of this process, a plurality of candidate clusters for the data points has been determined, together with a binary tree having nodes representing the candidate clusters and their parent-child relationships. Additionally, each candidate cluster (and/or node in the binary tree), is labelled with a value for the parameter 'distanceBirth' and a value for the parameter 'distanceDeath'. Furthermore, each of the plurality of data points is labelled with a value for the 'distanceBleed' parameter and a value for the 'parentID' parameter. For each candidate cluster, a unique identifier is stored, as well as an indication of its ancestor candidate clusters, i.e. which candidate clusters it is part of.

The parameter 'distanceDeath' for a candidate cluster may effectively correspond to an edge weight of a longest edge of the minimum spanning tree in that candidate cluster. In other words, the parameter 'distanceDeath' indicates the weight of the longest edge between two points belonging to the candidate cluster. The parameter 'distanceBirth' for a given candidate cluster corresponds to an upper bound for edge weights of edges of the minimum spanning tree that in that candidate cluster. In particular, the parameter 'distanceBirth' for a given candidate cluster is defined as an edge weight of an edge of the minimum spanning tree which, when removed from the minimum spanning tree, splits a parent candidate cluster into that candidate cluster and another candidate cluster. In other words, the 'distanceBirth' parameter corresponds to the edge of the minimum spanning tree that was removed to produce the candidate cluster in question. The parameter 'distanceBirth' for the root candidate cluster 304 may be treated as being infinite, or may be set to a large value compared to the other candidate clusters. The 'parentID' parameter for a data point may indicate the smallest candidate cluster that it is part of. The 'distanceBleed' parameter for a data point is indicative of a weight of a longest edge of the minimum spanning tree which, when removed, causes the data point to no longer be connected to any candidate cluster (i.e. such that it is not part of a group of connected data points having at least M data points).

Figure 3C:
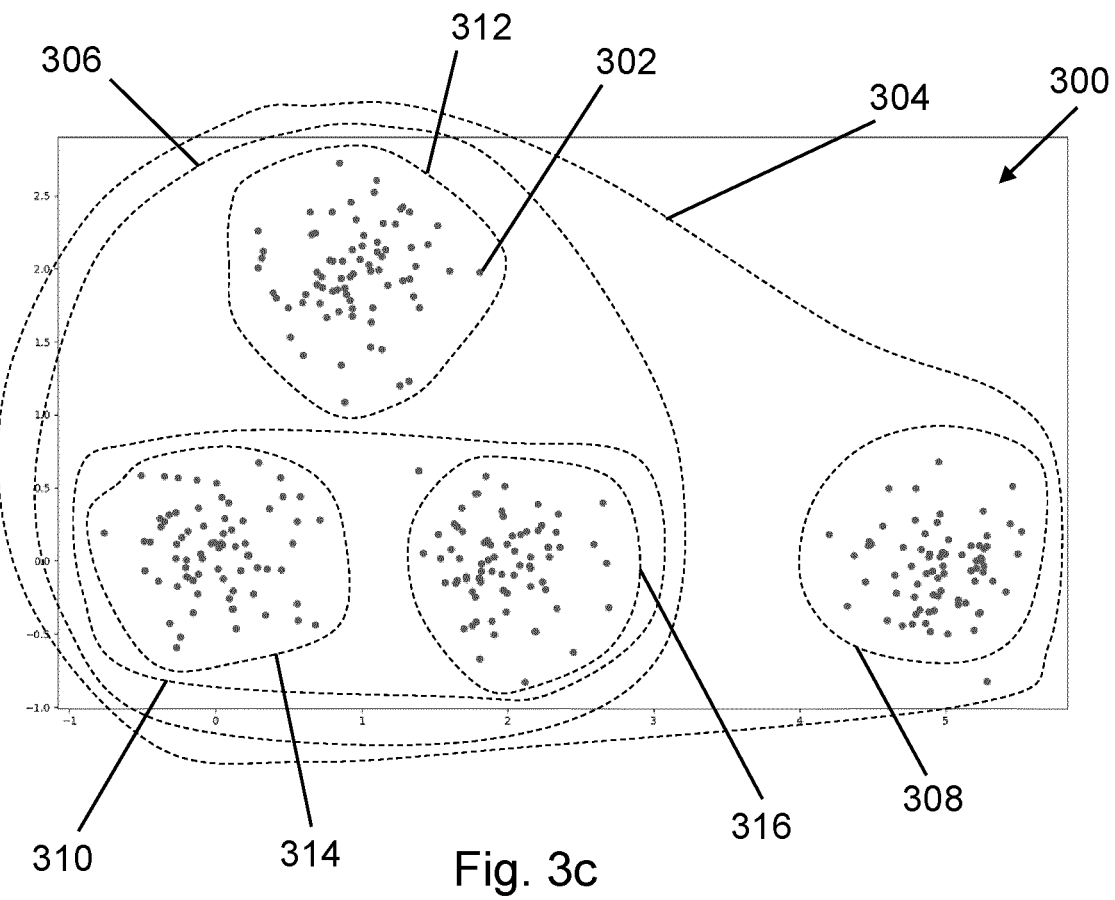
FIG. 3c is a schematic plot of the plurality of data points of FIG. 3a, including an indication of determined candidate clusters for the plurality of data points.
Figure 4:
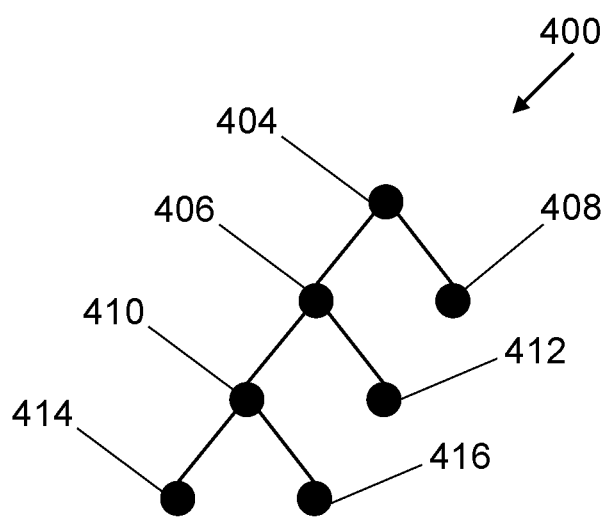
FIG. 4 is a drawing of a binary tree corresponding to the candidate clusters shown in FIG. 3.

As an example, a possible binary tree 400 corresponding to the plurality of data points 302 shown in FIG. 3a is depicted in FIG. 4. FIG. 3c shows the plurality of data points 302 of FIG. 3a, together with a plurality of candidate clusters that were determined for the data points. The candidate clusters are indicated in FIG. 3c by dashed lines, such that data points enclosed within the dashed lines correspond to the candidate clusters. The binary tree 400 has a root node 404 which corresponds to the root candidate cluster 304 shown in FIG. 3. The root candidate cluster 304 may then be split into two groups of data points, by removing the longest edge (i.e. the edge having the largest weight) from the minimum spanning tree. This may result in two child candidate clusters, each comprising more than M (for example, M=15) data points, shown as candidate clusters 306 and 308 in FIG. 3c. Accordingly, a first child node 406 representing the candidate cluster 306 and a second child node 408 representing the candidate cluster 308 is added to the binary tree 400, the first and second child nodes 406, 408 being children of the root node 404. The value of the parameter 'distanceBirth' for the candidate clusters 306, 308 may be set as the weight of the edge of the minimum spanning tree that was removed to split them apart. The value of the parameter 'distanceDeath' for the root node 304 may be set as the weight of the edge of the minimum spanning tree that was removed to split it into the candidate clusters 306, 308. This process may then be continued, by successively removing the longest edge from the minimum spanning tree. Thus, the candidate cluster 306 may be split into two child candidate clusters 310 and 312, both of which have more than M data points, and which are represented by the nodes 410 and 412 in the binary tree 400. The candidate cluster 310 can further be split into two child candidate clusters 314 and 316, both of which have more than M data points, and which are represented by the nodes 414 and 416 in the binary tree 400. The nodes 408, 412, 414, 416 are 'leaf' nodes of the binary tree 400, as they do not have any child nodes. This is because each corresponding candidate cluster could not be split into a pair of smaller candidate clusters, both having more than M data points.

It should be noted that, in other embodiments, different types of tree structures other than a binary tree may be used. For example, in some embodiments, a tree structure where each parent node may have more than two child nodes can be used.

The value of the input parameter M may be set to any suitable value, and may depend on the context in which the invention is applied (e.g. depending on an expected minimum cluster size). For example, the inventors have found that, for data points which correspond to detected fluorophore locations in an SMLM image, a value of M between 10 and 20 (e.g. 15) may be suitable.

Once the binary tree and candidate clusters have been computed for the plurality of data points, the computer server 104 calculates one or more properties for each of the candidate clusters, as discussed above. Additionally, the computer server 104 may calculate a value that is representative of a stability of each of the candidate clusters. The stability Sc of a candidate cluster C may be defined as:

$$S_C = \sum_{P \in C} \frac{1}{\max(distanceDeath, P(distanceBleed))} - \frac{1}{distanceBirth} \quad (2)$$

where the sum is over all data points P that correspond to the candidate cluster C, where distanceDeath is the value of that parameter for the candidate cluster C, distanceBirth is the value of that parameter for the candidate cluster C, and P(distanceBleed) is the value of the parameter distanceBleed for data point P.

The computer server 104 may then transmit data indicative of the determined candidate clusters (including the constructed binary tree), the properties that were calculated for each candidate cluster, and the calculated stability of each cluster, to the client device 102. The values of distanceBirth and distanceDeath determined for each candidate cluster may be included in the properties for each candidate cluster that are transmitted to the client device. Additionally, the values of parentID and distanceBleed may be provided to the client device 102, for each of the sample of data points that is transmitted to the client device 102. Upon receiving the binary tree and candidate clusters, the client device 102 may create a look-up table that links each candidate cluster to all of its ancestor clusters, based on the binary tree. In particular, the client device may determine for each candidate cluster, based on the binary tree, a list of candidate clusters that are ancestors of that candidate cluster. A candidate cluster is said to be an ancestor of another candidate cluster if it is larger than that candidate cluster, and includes all of the data points of that candidate cluster. Such a look-up table may be stored at the client device 102, in order to facilitate subsequent labelling of data points once candidate clusters have been selected.

FIGS. 5a and 5b show examples of data structures that may be stored at the computer server 104 and transmitted to the client device 102. FIG. 5 shows a table 500 comprising data relating to each of the determined candidate clusters. A first column titled "Candidate cluster ID" in table 500 stores a unique identifier for each of the determined candidate clusters. In the example shown, the unique identifier for each candidate cluster is a number, however in other examples any suitable type of identifier may be used. The second column of table 500 stores a value of the 'distanceBirth' parameter for each candidate cluster, the third column stores a value of the 'distanceDeath' parameter for each candidate cluster, the fourth column stores a value of the stability Sc for each candidate cluster, and the remaining columns store values of determined properties for each of the candidate clusters. In the example shown, values of a 'Property 1' and a 'Property 2' have been determined for each candidate cluster. These may correspond to any of the properties that can be determined for candidate clusters mentioned above. The table 500 may store values for more or fewer properties, depending on the number of properties determined by the computer server 104. Of course, various other forms of data structure, other than table 500, may be used for storing and transmitting data related to the determined candidate clusters.

FIG. 5b shows a table 502 comprising data relating to each of the plurality of data points. A first column of table 502 stores an 'X' coordinate for each data point, whilst a second column of table 502 stores a 'Y' coordinate for each data point. Of course the table 502 may be adapted depending on the specific coordinate system used for the data points. A third column of the table 502 stores a value of the 'distanceBleed' parameter for each data point, and a fourth column of table 502 stores a value of the parentID' parameter for each data point. The table 502 may also store any further data that has been determined for each data point. The data of table 502 relating to the data points may be stored in a manner which facilitates fetching data fora subsample of the plurality of data points, e.g. in order to facilitate display of a subsample of the data points at the client device 102. For example, the data of table 502 may be stored in a quadtree data structure, and/or in a multi-resolution data structure. Where the computer server 104 only transmits a subsample of the plurality of data points to the client device, the computer server 104 may only transmit a portion of the data stored in table 502 corresponding to the subsample of data points.

Figure 6:
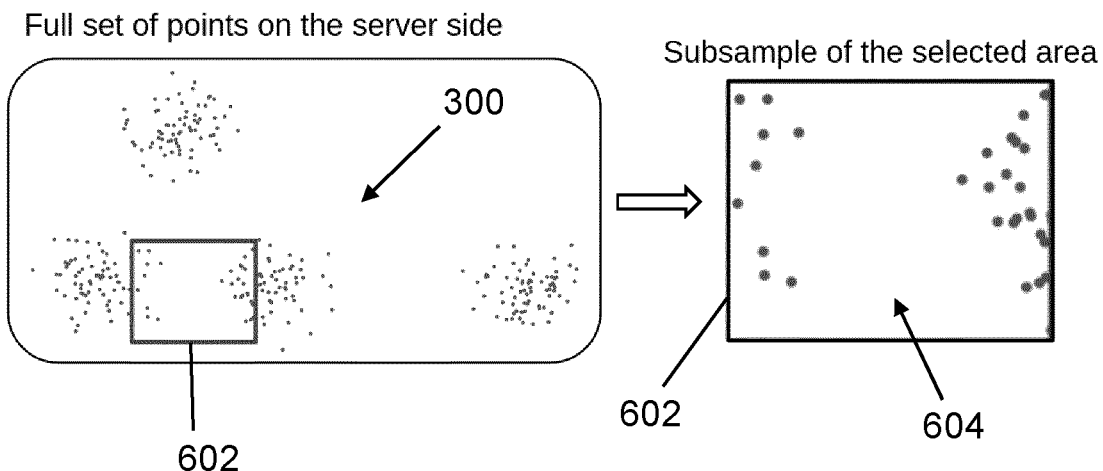
FIG. 6 is a diagram illustrating a process of selecting a subsample of data points from a plurality of data points.

FIG. 6 illustrates the transmission of a sample of data points from the computer server 104 to the client device. The left-hand panel of FIG. 6 shows a plot of the plurality of data points 302 stored at the computer server 104, together with an indication of a field of view 602 which is currently displayed at the client device 102. As discussed above, the client device 102 may transmit data indicative of the current field of view to the computer server 104, to enable the computer server 104 to determine a location of the current field of view relative to the data points. The computer server 104 then determines which of the plurality of data points is located in the current field of view 602, based on the coordinates of the data points. A subsampling process is then applied to the data points located in the field of view 602, to select a subsample of the data points located in the field of view 602. An example of a selected subsample 604 of the data points corresponding to the field of view 602 is shown in the right-hand panel of FIG. 6. The selected subsample 604 of the data points is then transmitted to the client device, together with data from table 502 corresponding to the selected subsample of data points.

A first process for selecting one or more candidate clusters from the plurality of candidate clusters will now be described, which may be performed, for example, by the client device 102. First, a cluster constraint relating to one or more of the calculated properties for the candidate clusters is determined, e.g. based on an input made by the user via the user interface 202, as discussed above. The properties of the candidate clusters are then compared with the determined cluster constraint, to determine which candidate clusters do not satisfy the determined cluster constraint. Any of the candidate clusters whose properties do not satisfy the determined cluster constraint are rejected, and their stability is set to zero.

Then, considering each of the nodes of the binary tree 400, starting with the leaf nodes and working up through the binary tree 400 in a topological order, the following steps are performed:

If the node is a leaf node, or if the node represents a candidate cluster whose stability is greater than a sum of the stabilities of candidate clusters represented by child nodes of that node, mark that node as 'viable'. Also, mark any nodes that are descendants (e.g. child, grand-child, etc. nodes) of that node as 'unviable'. In other words, nodes representing candidate clusters that are smaller and contained within the candidate cluster represented by the current node are marked as 'unviable'.

Otherwise, mark the node as 'unviable'. If the node represents a candidate cluster whose stability is less than a sum of the stabilities of candidate clusters represented by child nodes of that node, then, for further comparisons involving that node, that sum of the stabilities is used as the stability for that node.

At the end of this procedure, each node in the binary tree 400 is marked as either 'viable' or 'unviable'. Candidate clusters which are represented by nodes marked as 'viable' are then selected, and serve as a clustering result. As the rejected candidate clusters have their stability set to zero, their corresponding nodes will typically be marked as 'unviable', and so they will not be selected. The above procedure for selecting candidate clusters maximises a sum of the stabilities of the one or more selected candidate clusters.

Figure 7A:
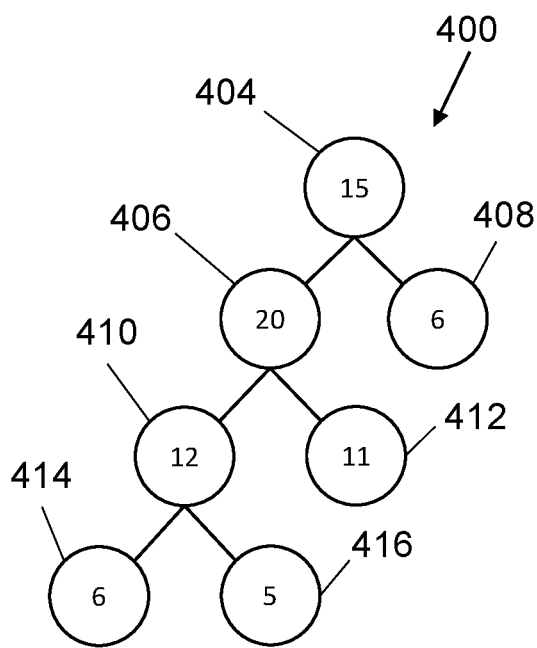
FIGS. 7a and 7b are drawings of the binary tree of FIG. 4, which show determined stability values for the corresponding candidate clusters.

An example of this process for selecting one or more of the candidate clusters is described with reference to FIGS. 7a and 7b. FIG. 7a shows the binary tree 400 described above, where the determined stability for each candidate cluster is indicated at its representative node. After the cluster constraint has been determined, the client device 102 determines which of the candidate clusters do not satisfy the determined cluster constraint. In the example shown, the client device 102 determines that the candidate cluster 312, represented by the node 412 in the binary tree 400, does not satisfy the determined cluster constraint, e.g. because a value of a property of the candidate cluster 312 does not fall within a desired range. As a result, the candidate cluster 312 is rejected, and its stability is set to zero. This is illustrated in FIG. 7b, which shows the binary tree 400 with the stability values of the candidate clusters after rejection of the candidate cluster 312.

Figure 7B:
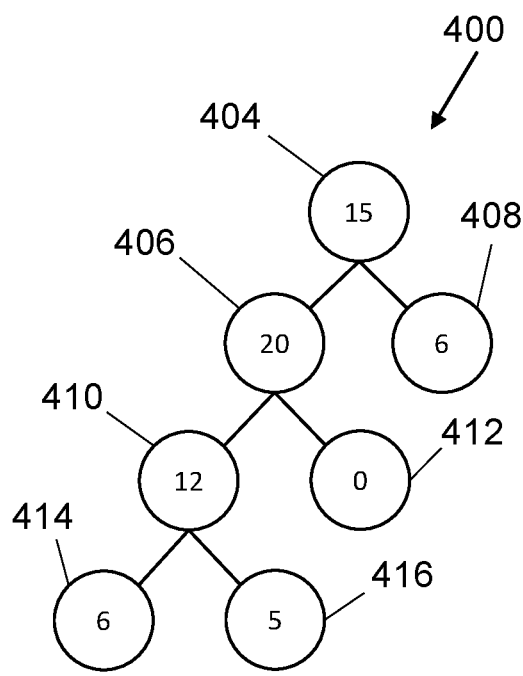

Using the binary tree 400 and the stability values shown in FIG. 7b, the client device 102 then selects on or more of the candidate clusters. Starting at the leaf nodes, each leaf node (i.e. nodes 414, 416, 412, 408) may be initially marked as 'viable'. Moving up the binary tree to node 410, node 410 is marked as viable (as 12>5+6), and its child nodes 414 and 416 are marked as 'unviable'. Moving up the binary tree to node 406, node 406 is marked as 'viable' (as 20>12+0), and its child nodes 410 and 412 are marked as 'unviable'. Moving up the binary tree to the root node 404, node 404 is marked as 'unviable' (as 15<20+6). At the end of this process, nodes 406 and 408 are marked as viable, such that the candidate clusters 306 and 308 are selected.

A second process for selecting one or more candidate clusters from the plurality of candidate clusters will now be described, which may be performed, for example, by the client device 102. In this example process, the user interface 202 provided at the client device 102 may enable the user to set a value for a distance parameter 'eps', which is then used by the client device 102 as the cluster constraint. Alternatively, a default value of the distance parameter 'eps' may be used by the client device 102, e.g. where no input is received from the user. The client device may then select, from the plurality of candidate clusters, each candidate cluster which satisfies the following relationship:

$$\text{distanceDeath} < \text{eps} < \text{distanceBirth} \quad (3)$$

In other words the value of the parameter 'distanceDeath' for each selected cluster is less than the value of 'eps', and the value of the parameter 'distanceBirth' for each selected cluster is greater than the value of 'eps'. This method of selecting candidate clusters effectively equates to rejecting candidate clusters that include data points between which an edge of the minimum spanning tree has a weight greater than the value of 'eps'. Of course, other relationships, other than (3) may be used for selecting candidate clusters based on their values for 'distanceDeath' and 'distanceBirth', and the distance parameter 'eps'. In addition to selecting candidate clusters using the distance parameter 'eps', the client device 102 may label data points whose value of the parameter 'distanceBleed' is greater than the value of 'eps' as not corresponding to one of the selected candidate clusters, e.g. such data points may be labelled as corresponding to noise.

As discussed above, following the selection of one or more candidate clusters, the client device 102 may then assign labels to the sample of data points based on the selected candidate clusters, and/or display a visualisation of the selected clusters. The binary tree 400 may be used when assigning labels to the sample of data points. To determine a label to be assigned to a data point, the client device 102 may first look up its 'parentID' value, to determine the smallest candidate cluster which it is part of. If that candidate cluster corresponding to the 'parentID' value has been selected, then the data point is labelled according to that candidate cluster. On the other hand, if the candidate cluster indicated by the 'parentID' value has not been selected, then the client device 102 checks in turn each ancestor candidate cluster going up the binary tree (i.e. going from child node to parent node), until a selected candidate cluster is reached or the root cluster is reached. If a selected candidate cluster is found when going up the binary tree in this manner, then the data point is labelled in accordance with the selected candidate cluster (e.g. with the identifier of the selected candidate cluster). If no selected candidate cluster is found when going up the binary tree, then the data point is labelled as not belonging to any of the selected candidate clusters. In this manner, it is possible to individually label the data points based on the selected candidate clusters. Of course, other techniques for individually labelling the data points at the client device 102 may also be used.

Figure 8:
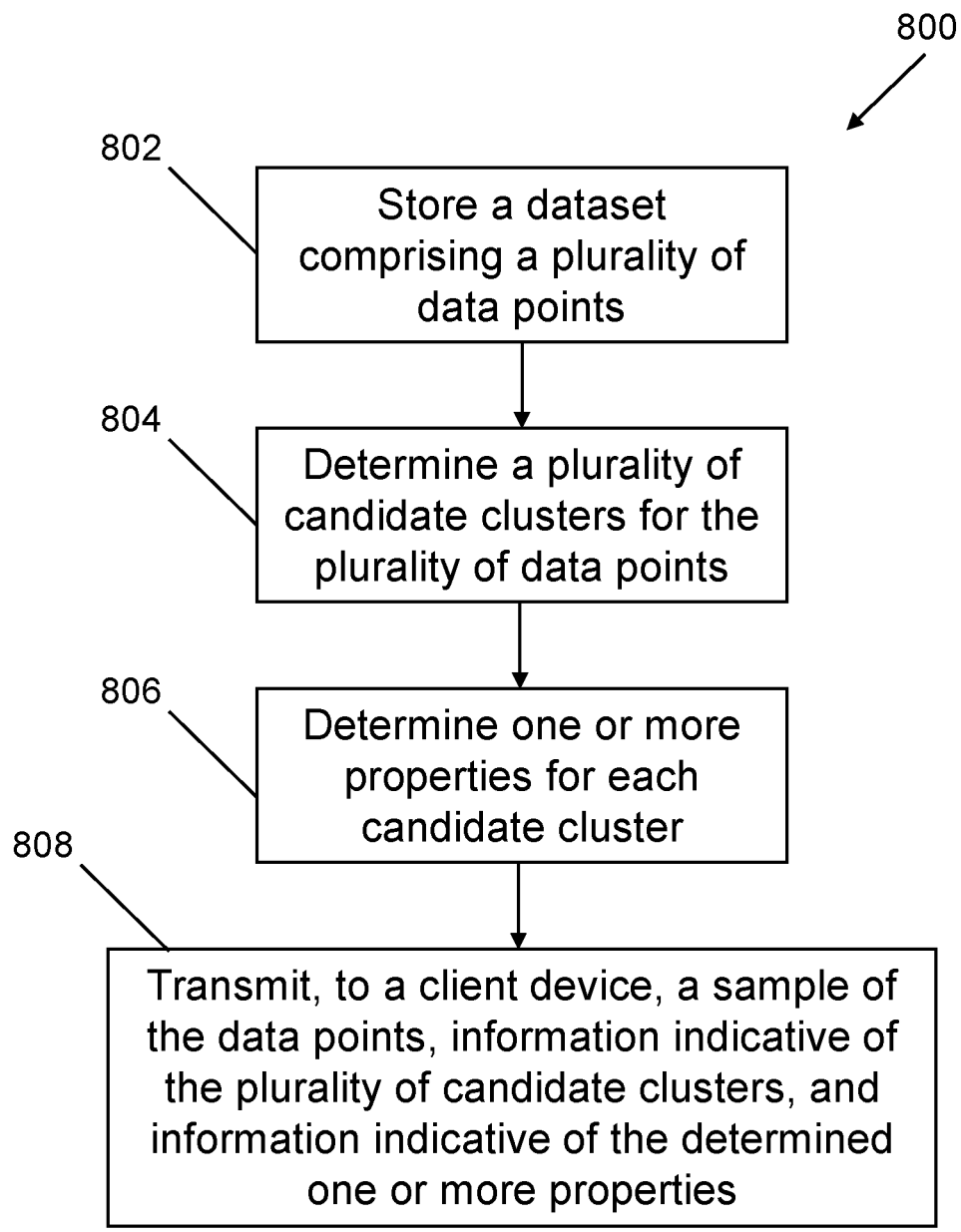
FIG. 8 shows a flow diagram of a method according to an embodiment of the invention.

FIG. 8 shows a flow diagram illustrating a method 800 which is performed by a computer server, according to an embodiment of the invention. The method 800 may, for example, be performed by the computer server of 104 of the system 100 discussed above. In a first step 802, the method 800 involves storing, at the computer server, a dataset comprising a plurality of data points. The plurality of data points may, for example, be data points in a two-dimensional or a three-dimensional space, as discussed above. Next, in step 804, the method 800 involves determining a plurality of candidate clusters for the plurality of data points, where each candidate cluster corresponds to a respective set of the plurality of data points. This may be achieved using various known clustering algorithms, such as HDBSCAN. Next, in step 806, the method 800 involves determining, for each candidate cluster, one or more properties of that candidate cluster. The one or more properties may relate to any properties or parameters of the candidate clusters that may be used to characterise the candidate clusters. As an example, the one or more properties may comprise one or more of: a number of data points in the candidate cluster, a skew of the candidate cluster, a circularity of the candidate cluster, a density of the candidate cluster, an area of the candidate cluster, a volume of the candidate cluster, a radius of gyration of the candidate cluster, and/or a length of the candidate cluster. Other properties of the candidate clusters are also possible. The one or more properties for each candidate cluster may be calculated using the coordinates of the data points that belong to that cluster. Subsequently, at step 808, the method involves transmitting, to a client device, a sample of the plurality of data points, information indicative of the plurality of candidate clusters, and information indicative of the one or more properties determined for each candidate cluster. For example, the computer server may transmit the data to the client device 102 discussed above. The computer server may perform the transmission in step 808 using any suitable communication channel between the computer server and the client device, including wired and wireless communication channels. Any of the features discussed above in relation operation of the system 100, and in particular of the computer server 104, may be shared with the method 800.

Figure 9:
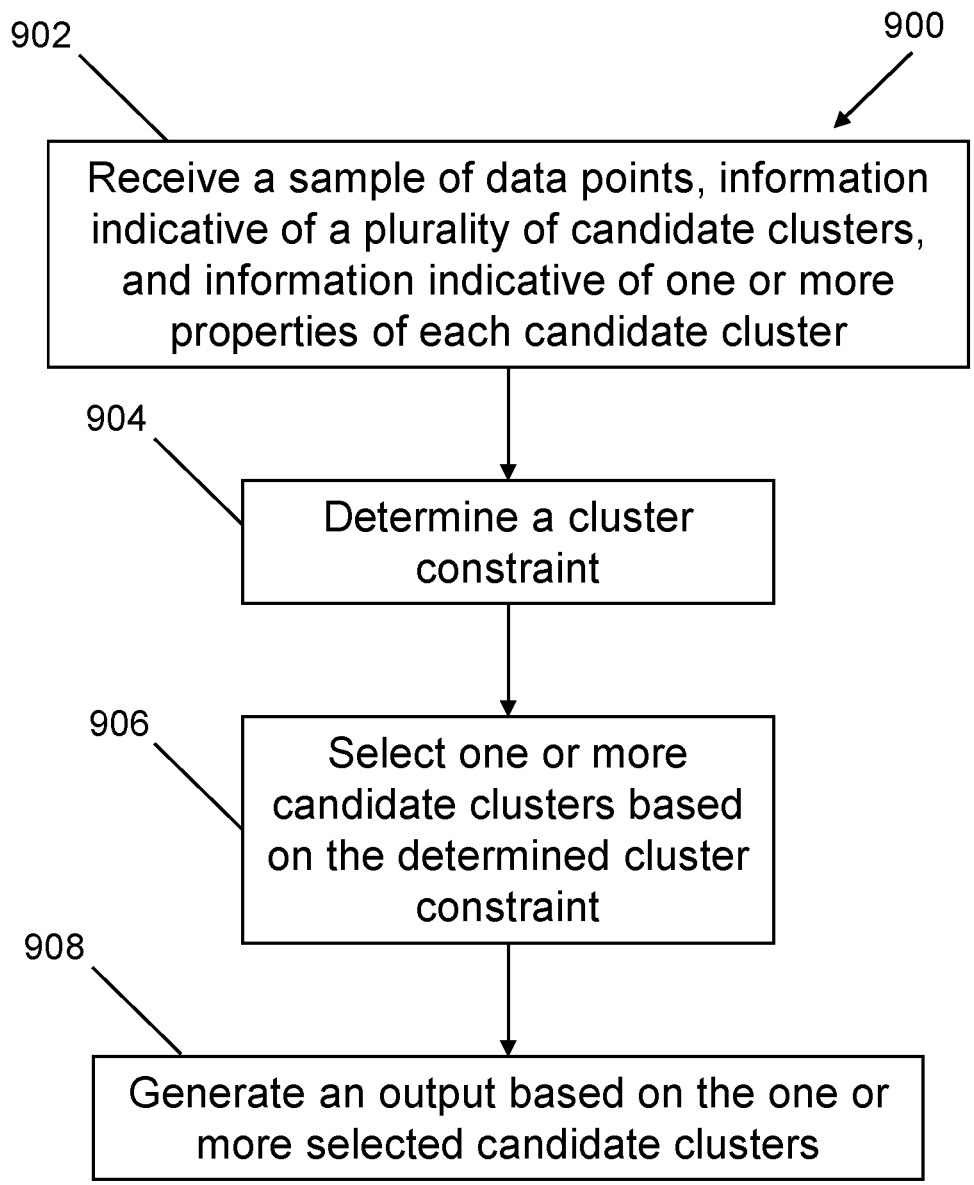
FIG. 9 shows a flow diagram of a method according to an embodiment of the invention.

FIG. 9 shows a flow diagram illustrating a method 900 which is performed by a client device, according to an embodiment of the invention. The method 900 may, for example, be performed by the client device 102 of the system 100 discussed above. In a first step 902, the method 900 involves receiving, from a computer server, a sample of data points, information indicative of a plurality of candidate clusters, and information indicative of one or more properties of each candidate cluster, wherein each candidate cluster corresponds to a respective set of the sample of data points. For example, the client device may receive the data from the computer server 104 discussed above. Then, in step 904, the method 900 involves determining a cluster constraint, wherein the cluster constraint relates to at least one of the one or more properties. The cluster constraint may be determined in any suitable manner. For example, the cluster constraint may be determined automatically, or based on a user input made at the client device, as discussed above. Next, in step 906, the method 900 involves selecting one or more candidate clusters from the plurality of candidate clusters, wherein the at least one property of each selected candidate cluster satisfies the determined cluster constraint, and wherein each data point from the sample of data points belongs to at most one of the one or more selected candidate clusters. Subsequently, at step 908, the method 900 involves generating an output based on the one or more selected candidate clusters. For example, the client device may display the one or more selected candidate clusters.

The method 900 may follow on from the method 800. In other words, in some embodiments, there is provided a method which comprises the steps of the method 800 followed by the steps of the method 900. Such a method may be implemented using the system 100 discussed above.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A client device configured to:
receive, from a computer server, a sample of data points, information indicative of a plurality of candidate clusters, and information indicative of one or more properties of each candidate cluster, wherein each candidate cluster corresponds to a respective set of the sample of data points;
determine a cluster constraint, wherein the cluster constraint relates to at least one of the one or more properties;
select one or more candidate clusters from the plurality of candidate clusters, wherein the at least one property of each selected candidate cluster satisfies the determined cluster constraint, and wherein each data point from the sample of data points belongs to at most one of the one or more selected candidate clusters; and
generate an output based on the one or more selected candidate clusters.

2. A client device according to claim 1, further configured to determine the cluster constraint based on a user input received at the client device.

3. A client device according to claim 2, further configured to display a user interface for receiving a user input, wherein the user interface is arranged to enable selection of a value or range of values for the at least one property, and wherein the client device is configured to determine the cluster constraint based on a value or range of values for the at least one property selected via the user interface.

4. A client device according to claim 1, configured to display information indicative of the one or more selected candidate clusters.

5. A client device according to claim 1, further configured to, for each data point in the sample of data points:
determine if the data point is part of one of the selected candidate clusters or not; and
assign a label to the data point based on the determination.

6. A client device according to claim 5, further configured to display the sample of data points and their assigned labels.

7. A client device according to claim 1, further configured to receive, from the computer server, information indicative of a stability of each of the plurality of candidate clusters, and to select the one or more candidate clusters from the plurality of candidate clusters by: rejecting any of the plurality of candidate clusters whose at least one property does not satisfy the determined cluster constraint; and
selecting one or more of the remaining candidate clusters, such that a sum of the stabilities of the selected one or more of the remaining candidate clusters is maximised.

8. A client device according to claim 7, wherein the information indicative of the plurality of candidate clusters comprises a tree structure having a plurality of nodes in which each node represents a respective one of the plurality of candidate clusters, where the plurality of nodes are arranged such that:
a root node of the tree structure represents a candidate cluster that corresponds to all of the data points in the sample of data points; and
each child node of the tree structure represents a child candidate cluster that corresponds to a respective subset of a set of data points that corresponds to a parent candidate cluster, which is represented by a parent node for that child node.

9. A client device according to claim 8, wherein the client device is configured to, for each node in the tree structure:
determine if the stability of the candidate cluster represented by that node is greater than a sum of stabilities of candidate clusters represented by any child nodes of that node and, if so, select the candidate cluster represented by that node.

10. A client device according to claim 1, wherein the sample of data points is a sample from a dataset comprising a plurality of data points stored at the computer server, where a minimum spanning tree connects the plurality of data points, wherein the information indicative of the one or more properties comprises, for each of the plurality of candidate clusters, an indication of an upper bound for edge weights of edges of the minimum spanning tree in that candidate cluster, and wherein the client device is further configured to:
determine, as the cluster constraint, a distance parameter;
reject any of the plurality of candidate clusters for which the upper bound is greater than the distance parameter; and
select one or more of the remaining candidate clusters.

11. A client device according to claim 1, further configured to: display data points within a field of view;
transmit, to the computer server, an indication of a current field of view displayed by the client device; and
receive a sample of data points from the computer server, wherein the sample of data points corresponds to the current field of view.

12. A client device according to claim 1, wherein the sample of data points corresponds to feature locations in a biological image.

13. A computer server configured to store a dataset comprising a plurality of data points;
determine a plurality of candidate clusters for the plurality of data points, where each candidate cluster corresponds to a respective set of the plurality of data points;
determine, for each candidate cluster, one or more properties of that candidate cluster; and transmit, to a client device, a sample of the plurality of data points, information indicative of the plurality of candidate clusters, and information indicative of the one or more properties determined for each candidate cluster.

14. A computer server according to claim 13, configured to determine the plurality of candidate clusters by:
constructing a minimum spanning tree for the plurality of data points;
defining a root candidate cluster that corresponds to all of the data points in the plurality of data points;
iteratively removing a longest edge in the minimum spanning tree; and
if removing the longest edge results in two groups of connected data points, each comprising more than a predetermined number of data points, defining each group of connected data points as a candidate cluster.

15. A computer server according to claim 14, further configured to determine, as one of the one or more properties for each of the plurality of candidate clusters, an upper bound for edge weights of a edges of the minimum spanning tree between data points corresponding to that candidate cluster.

16. A computer server according to claim 13, configured to generate a tree structure having a plurality of nodes, in which each node represents a respective one of the plurality of candidate clusters, where the plurality of nodes are arranged such that:
a root node of the tree structure represents a root candidate cluster that corresponds to all of the data points in the plurality of data points; and
each child node of the tree structure represents a child candidate cluster that corresponds to a subset of a set of data points that corresponds to a parent candidate cluster, which is represented by a parent node for that child node; and
wherein the information indicative of the plurality of candidate clusters comprises the tree structure.

17. A computer server according to claim 13, wherein the sample of the plurality of data points transmitted by the computer server to the client device is a subsample of the plurality of data points.

18. A computer server according to claim 13, further configured to:
receive, from the client device, an indication of a current field of view displayed by the client device; and
transmit the sample of data points to the client device, wherein the sample of data points corresponds to the current field of view.

19. A computer server according to claim 13, configured to determine one or more of the following properties for each candidate cluster: a number of data points in the candidate cluster, a skew of the candidate cluster, a circularity of the candidate cluster, a density of the candidate cluster, an area of the candidate cluster, a volume of the candidate cluster, a radius of gyration of the candidate cluster, and/or a length of the candidate cluster.

20. A computer server according to claim 13, wherein the plurality of data points corresponds to feature locations in a biological image.

21. A system for clustering data points, the system comprising a computer server and a client device, wherein the computer server is configured to:
store a dataset comprising a plurality of data points;
determine a plurality of candidate clusters for the plurality of data points, where each candidate cluster corresponds to a respective set of the plurality of data points;
determine, for each candidate cluster, one or more properties of that candidate cluster; and
transmit, to the client device, a sample of the plurality of data points, information indicative of the plurality of candidate clusters, and information indicative of the one or more properties determined for each candidate cluster;
wherein the client device is configured to:
receive the sample of data points, information indicative of the plurality of candidate clusters, and information indicative of the one or more properties determined for each candidate cluster, from the computer server;
determine a cluster constraint, wherein the cluster constraint relates to at least one of the one or more properties of each candidate cluster;
select one or more candidate clusters from the plurality of candidate clusters, wherein the at least one property of each selected candidate cluster satisfies the determined cluster constraint, and wherein each data point from the sample of data points belongs to at most one of the one or more selected candidate clusters; and
generate an output based on the one or more selected candidate clusters.

22. A method of clustering data points at a client device, the method comprising, at the client device:
receiving, from a computer server, a sample of data points, information indicative of a plurality of candidate clusters, and information indicative of one or more properties of each candidate cluster, wherein each candidate cluster corresponds to a respective set of the sample of data points;
determining a cluster constraint, wherein the cluster constraint relates to at least one of the one or more properties of each candidate cluster;
selecting one or more candidate clusters from the plurality of candidate clusters, wherein the at least one property of each selected candidate cluster satisfies the determined cluster constraint, and wherein each data point from the sample of data points belongs to at most one of the one or more selected candidate clusters; and
generating an output based on the one or more selected candidate clusters.

23. A method of processing a dataset, the method comprising, at a computer server:
storing a dataset comprising a plurality of data points;
determining a plurality of candidate clusters for the plurality of data points, where each candidate cluster corresponds to a respective set of the plurality of data points;
determining, for each candidate cluster, one or more properties of that candidate cluster; and transmitting, to a client device, a sample of the plurality of data points, information indicative of the plurality of candidate clusters, and information indicative of the one or more properties determined for each candidate cluster.

24. A method of clustering data points with a system comprising a computer server and a client device, the method comprising:
storing a dataset comprising a plurality of data points;
determining a plurality of candidate clusters for the plurality of data points, where each candidate cluster corresponds to a respective set of the plurality of data points;
determining, for each candidate cluster, one or more properties of that candidate cluster; and
transmitting, to the client device, a sample of the plurality of data points, information indicative of the plurality of candidate clusters, and information indicative of the one or more properties determined for each candidate cluster;

the method further comprising, with the client device:

receiving the sample of data points, information indicative of the plurality of candidate clusters, and information indicative of the one or more properties determined for each candidate cluster, from the computer server;

determining a cluster constraint, wherein the cluster constraint relates to at least one of the one or more properties of each candidate cluster;

selecting one or more candidate clusters from the plurality of candidate clusters, wherein the at least one property of each selected candidate cluster satisfies the determined cluster constraint, and wherein each data point from the sample of data points belongs to at most one of the one or more selected candidate clusters; and generating an output based on the one or more selected candidate clusters.

* * * * *